US005890105A

United States Patent [19]

Ishihara et al.

[11] Patent Number: 5,890,105

[45] Date of Patent: Mar. 30, 1999

[54] LOW BIT RATE CODING SYSTEM FOR HIGH SPEED COMPRESSION OF SPEECH DATA

[75] Inventors: Teruo Ishihara; Hideaki Fukuda, both of Kawasaki, Japan

[73] Assignee: Fujitsu Limited, Kanagawa, Japan

[21] Appl. No.: 537,458

[22] Filed: Oct. 2, 1995

[30] Foreign Application Priority Data

Nov. 30, 1994 [JP] Japan .................................... 6-296263

[51] Int. Cl.[6] ................................ G10L 3/02; G10L 9/00; G06F 7/00

[52] U.S. Cl. ...................................... 704/201; 364/715.06

[58] Field of Search .................................... 704/211, 201, 704/219, 220, 222; 371/43; 382/379; 364/728.01, 715.06, 736.01; 375/341

[56] References Cited

U.S. PATENT DOCUMENTS

| | | | |
|---|---|---|---|
| 4,462,101 | 7/1984 | Yasuda et al. | 371/43 |
| 4,567,572 | 1/1986 | Morris et al. | 364/900 |
| 4,575,770 | 3/1986 | Dieterich | 358/342 |
| 4,774,688 | 9/1988 | Kobayashi et al. | 364/900 |
| 5,262,969 | 11/1993 | Ishihara | 364/715.06 |
| 5,559,730 | 9/1996 | Marui et al. | 364/715.08 |

OTHER PUBLICATIONS

Ohya, T., "5.6 Kbits/s PSI–CELP of the half–rate PDC speech coding standard" Vehicular Technology 94, pp. 1680–1684.

Okumura, Y., "High Performance DSP for 5.6 Kbits/s Half–Rate PSI–CELP CODEC" DMR :94; 6th, pp. 220–225.

Ikekawa, M., "Effective Channel Coding Combined With Low Bit–RATE Speech Coding for Digital Cellular System" IEEE 94; pp. 1685–1689.

*Primary Examiner*—David R. Hudspeth
*Assistant Examiner*—Patrick N. Edouard
*Attorney, Agent, or Firm*—Helfgott & Karas, P C

[57] ABSTRACT

A data array forming circuit replaces part of software operation in a low bit rate coding system. The circuit includes a memory storing plural kinds of basic data groups, and an address generating circuit generating an address to access the memory. A data array is formed in accordance with input speech data by selectively reading plural kinds of blocks out of the basic data groups according to the address and by combining the plural read blocks containing different quantities of words. Each block contains an arbitrary quantity of word data. In a data sorting circuit to replace part of software operation in a low bit rate coding system, an index corresponding to the data is set with an initial value on initiating the sorting operation, and a value incremented successively from the initial value is set as an index of the next data. In a convolution coding circuit, test data are set in parallel into the shift register, by providing each input terminal of shift register flip-flops with a selector having two input terminals. One terminal is input with test data, or each flip-flop may be provided with a preset terminal and a clear terminal, where a preset signal according to the test datum is input to the preset terminal, and a clear signal is input to the clear terminal.

2 Claims, 22 Drawing Sheets

| STATE | F=0 | F=1 | F=2 | F=3 |
|---|---|---|---|---|
| 0 | B [N. 0] ~ B [N. 1] | B [N. 0] ~ B [N. 1] | B [N. 0] ~ B [N. 1] | B [N. 0] ~ B [N. 1] |
| 1 | A [N. 0] ~ A [N. 1+1] | B [N. 0] ~ B [N. 1] | C [N. 0] ~ C [N. 1] | D [N. 0] ~ D [N. 1-1] |
| 2 | D [N. 0] ~ D [N. 1] | B [N. 0] ~ B [N. 1] | D [N. 0] ~ D [N. 1-1] | B [N. 0] ~ B [N. 1] |
| 3 | C [N. 0] ~ C [N. 1] | B [N. 0] ~ B [N. 1] | A [N. 0] ~ A [N. 1] | D [N. 0] ~ D [N. 1-1] |
| 4 | B [N. 0] ~ B [N. 1-1] | B [N. 0] ~ B [N. 1] | B [N. 0] ~ B [N. 1] | B [N. 0] ~ B [N. 1] |
| 5 | | | C [N. 0] | D [N. 0]<br>D [N. 1] |

FIG. 6

| A<br>A2-A0 | B<br>B1-BO | X<br>X1.X0 | Y<br>Y1.Y0 |
|---|---|---|---|
| 000 | 00 | 00 | 01 |
| 001 | 00 | 11 | 00 |
| 010 | 00 | 10 | 01 |
| 011 | 00 | 01 | 01 |
| 100 | 00 | 01 | 01 |
| 101 | 00 | 01 | 01 |

(1) F=0

FIG. 9A

| A<br>A2-A0 | B<br>B1-BO | X<br>X1.X0 | Y<br>Y1.Y0 |
|---|---|---|---|
| 000 | 01 | 01 | 01 |
| 001 | 01 | 01 | 01 |
| 010 | 01 | 01 | 01 |
| 011 | 01 | 01 | 01 |
| 100 | 01 | 01 | 01 |
| 101 | 01 | 01 | 01 |

(2) F=1

FIG. 9B

| A<br>A2-A0 | B<br>B1-BO | X<br>X1.X0 | Y<br>Y1.Y0 |
|---|---|---|---|
| 000 | 10 | 10 | 01 |
| 001 | 10 | 11 | 01 |
| 010 | 10 | 00 | 10 |
| 011 | 10 | 01 | 01 |
| 100 | 10 | 10 | 01 |
| 101 | 10 | 01 | 01 |

(3) F=2

FIG. 9C

| A<br>A2-A0 | B<br>B1-BO | X<br>X1.X0 | Y<br>Y1.Y0 |
|---|---|---|---|
| 000 | 11 | 11 | 01 |
| 001 | 11 | 01 | 10 |
| 010 | 11 | 11 | 01 |
| 011 | 11 | 01 | 10 |
| 100 | 11 | 11 | 01 |
| 101 | 11 | 01 | 01 |

(4) F=3

FIG. 9D

| MAX | EQ | RA~RF:S | cmp |
|---|---|---|---|
| 0 | 0 | > | 0 |
| | | = | 1 |
| | | < | 1 |
| 0 | 1 | > | 0 |
| | | = | 0 |
| | | < | 1 |
| 1 | 0 | > | 1 |
| | | = | 1 |
| | | < | 0 |
| 1 | 1 | > | 1 |
| | | = | 0 |
| | | < | 0 |

Ci=1

RA~RF ≧ S ⟶ SIG=0

RA~RF < S ⟶ SIG=1

Ci=0

RA~RF > S ⟶ SIG=0

RA~RF ≦ S ⟶ SIG=1

FIG. 13

LOW BIT RATE CODING SYSTEM FOR HIGH SPEED COMPRESSION OF SPEECH DATA

BACKGROUND OF THE INVENTION

1. Field of the Invention

The present invention relates to a digital signal processing system which allows a high speed performance of compression of input speech data, that is, a low bit rate coding system, as well as relates an error correction coding system.

2. Description of the Related Arts

Shortage of radio frequency channels has become a serious problem caused by the increase in car telephones and portable telephones. Solution of the problem has been progressed by the employment of the digitalization technique and the compression technique. However, if it is attempted to solve the problem only by a software, i.e. by a firmware, the processing load becomes huge because the algorithm of the coding for decreasing the bit rate is complex and, accordingly, it is necessary to increase the memory capacity for the work area of the software. An expensive hardware, such as an efficient digital signal processor (DSP), is also needed therein for its real time processing.

On the other hand, portable equipments, such as portable telephones, are required to be small in size for the easy handling as well as to consume less power supplied from its battery in order to extend its operable period.

Various types of low bit rate coding methods have been already known to compress speech signals. For example, a vector quantizer as one of these low bit rate coding methods is such that: a code word is searched for to have a minimum residual power error of a difference between a speech input data and speech data synthesized with the linear predictive synthesis filter based on speech source data (code word) output from a codebook; then, the decrease of the bit rate is accomplished by synthesizing the speech according to the code data which minimizes the residual error power.

As for the vector quantizing method as the high efficiency low bit rate coding methods of speech signals, there have been employed a CELP (Code Excited Linear Prediction) coding method, an LD-CELP (Low Delay Code Excited Linear Prediction) coding method, and a VSELP (Vector Sum Excited Linear Prediction) coding method, etc.

In the vector quantizing method, plural word data in basic data groups are selected from the codebook as mentioned above corresponding to the input speech data so as to form a data array; speech data is synthesized with the linear predictive synthesis filter based on this data array; a residual power error of difference of the synthesized speech data and the input speech data is calculated; the residual power error data is calculated for each speech data synthesized according to the plural kinds of data arrays; then, a data array having a minimum residual power error is determined as the coded data. In this method, size of program to form the data arrays and to sort the data array that provides the minimum residual error power becomes comparatively large.

In this prior art method, the addresses to read the plural word data in the basic data groups of the codebook can be generated by the use of an address generating circuit in a processor such as digital signal processor (DSP) if the addresses change according to a simple rule. However, if the addresses of the individual word data composing the data array do not change in accordance with a simple rule, it is difficult to generate the addresses for reading the word data by the use of the address generating circuit of the processor. Therefore, the address generating operation must be performed by the use of operating function of the processor.

Algorithm of sorting processes, by which various data are compared, a maximum value or a minimum value is selected out of plural data, or a predetermined number of data are taken out in a descending order from the largest data or in an ascending order from the smallest data, have been already known. In performing these processes for plural operation results, it is usual that the operation results are once stored in a memory, and are read out of the memory after all the operation results are accomplished, for the comparison. That is, this kind of heavy processes must be performed even in a process to obtain a data array having a small residual error power.

In transmission lines where the transmission errors are apt to take place, such as radio channel, there has been employed a method to transmit the coded data in which the bit rate has been decreased by the low bit rate coding, by the use of convolution coding method according to a predetermined constraint length. In the receiver station, an error correction decoding is performed by a decoding means which employs a maximum likelihood decoding (decipherment) method such as Viterbi decoder. In such convolution coding system, there is provided a convolutional coding circuit which contains a shift register having its stages a quantity of which is in accordance with the constraint length.

Because in a prior art system the change of addresses in forming the data array by reading out plural word data out of the basic data groups in the codebook is comparatively complex, the address generating operation has been done by the operational function of the processor, that is, by a software. Therefore, there has been a problem in that the main data processing in the processor, such as the residual error power calculation, is restricted. There has been another problem in an increase in power consumption caused from an increase in processing cycles in the addressing operation, as well as in an increase in the memory capacity required for its work area, etc.

There has been still another problem in that the complex and large program is required in retrieving a predetermined number of the operation results, such as the residual power error of the difference between the input speech data and the synthesized speech data, in descending order from the maximum value, or in retrieving a predetermined number of the result data in ascending order from the minimum value; accordingly it is difficult to process the operation efficiently.

Convolution coding circuits correctly recover an erroneous signal by performing a convolution operation of a single bit of a serial input data and past plural bits. The convolution coding circuit includes a shift register by which the serial input data is shifted one by one, where it is difficult to observe the contents of the shift registers from its outside. Accordingly, it is difficult to check the match of the convolution operated results with the contents of the shift register. Thus, there is a problem in that it is not easy to check efficiently the convolution coding circuit. This is because an n-bit shift register having $2^n$ kinds of its contents requires n cycles of the shifting operations; accordingly, $n\text{x}2^n$ cycles of the shift inputs are required in order to obtain the $2^n$ kinds of the contents. Consequently, there is a problem in that it takes a long time in preparing test data necessary for verifying the convolution coding circuit and in verifying the convolution coding circuit.

SUMMARY OF THE INVENTION

It is a general object of the present invention to form data arrays, to sort the operation result data and/or to verify the convolution coding circuit easily as well as efficiently in a low bit rate coding system, by the use of hardware circuit to replace some part of software operations.

It is another object of the present invention to provide a convolution coding circuit which allows a verification operation with less operation steps.

A low bit rate coding system according to the present invention comprises: a processor for processing an input speech data input thereto so as to output a first input data; and a data array forming circuit to receive the first input data and comprises: a memory device for storing a plurality of kinds of basic data groups; and an address generating circuit for generating an address to access the memory device, so that the data array forming circuit forms a data array in accordance with the input speech data by selectively reading plural kinds of blocks out of the basic data groups according to the address, each of the blocks contains word data of an arbitrary quantity specified by the processor, and by combining a plurality of the read blocks where each of the read blocks contains different quantity of words.

The address generating circuit may comprise: a first selector for selecting a head address of said block; a first counter to be set with the head address selected by the first selector, for outputting the address of the word data; a second counter for counting a quantity of the word data read out from the memory device according to the address output from the first counter; and a comparator for comparing a count counted by the second counter with the quantity of word data set in each block, and for setting a head address of next word data selected at an equality comparison result by the first selector in the first counter.

The address generating circuit may comprises: a first selector for selecting a head address of the block; a first counter to be set with said head address selected by the first selector, for outputting the address of the word data; a second counter for counting the quantity of the word data read out from the memory device according to the address output from the first counter; and a comparator for comparing a count counted by the second counter with the quantity of word data set in each block, and for setting a head address of a next word data selected at an equality comparison result by the first selector into the first counter. Wherein the first selector performs a state transition every time the each block of word data is read out of the memory device so as to select a head address of the block in accordance with the transited state.

The address generating circuit may further comprise a control circuit for controlling the selection of the quantity of word data to be compared with the count of the second counter.

A low bit rate coding system according to the present invention comprises: a processor for processing an input speech data input thereto so as to output a second input data; and a data sorting circuit receiving the second input data, for performing a sorting operation such that a minimum or a maximum out of a plurality of the second input data is retrieved, as well as a predetermined quantity of data counted from the minimum or the maximum in an ascending order or in a descending order are retrieved respectively; and for outputting results of the sorting operation as indexes corresponding to the sorted data in addition to data of the sorted results, wherein the data sorting circuit may be constituted such that the index is set with an initial value on initiating the sorting operation, and a value incremented successively from the initial value is set as an index of the next data, wherein the data sorting circuit may comprise: a comparison circuit for comparing a first data with a second data, where the comparison circuit may comprise: a first adder to which input are the first data and an inverse of the second data; a second adder to which input are a carry of the first adder, a sign bit of the first data and a sign bit of the inverse of the second data; a judging circuit for detecting which of the compared data larger is, according to a sign bit output from the second adder, wherein the data sorting circuit may comprise: a status counter capable of setting therein a quantity of data to be retrieved in ascending order or descending order from the minimum or the maximum, respectively, and wherein the data sorting circuit may further comprise: a mode setting circuit for specifying a condition to sort a maximum, a minimum or equal data having different index.

A convolution coding circuit according to the present coding circuit comprises: a shift register and a convolution coding operation circuit for processing a convolution coding operation of data to be sent out, wherein test data are set in parallel into the shift register, and wherein each input terminal of flip-flops constituting the shift register may be provided with a selector having a first input terminal and a second input terminal, where the first input terminal is input with data from the preceding flip-flop, and the second input terminal is input with a test datum, or wherein the convolution coding circuit may be constituted such that each flip-flop of the shift register is provided with a preset terminal and a clear terminal, where a preset signal in accordance with the test datum is input to the preset terminal, and a clear signal is input to the clear terminal.

The above-mentioned features and advantages of the present invention, together with other objects and advantages, which will become apparent, will be more fully described hereinafter, with references being made to the accompanying drawings which form a part hereof, wherein like numerals refer to like parts throughout.

A BRIEF DESCRIPTION OF THE DRAWINGS

FIG. 1 schematically illustrates a coder block diagram of an algorithm for a low bit rate coding of a speech signal, for which the present invention can be typically embodied;

FIG. 2 schematically illustrates a general configuration of a low bit rate coding system according to the present invention;

FIG. 3 schematically illustrates a data array forming circuit in detail;

FIG. 4 schematically illustrates a function of data array formation;

FIG. 5 schematically illustrates address space in the memory;

FIG. 6 schematically illustrates an address generation rule;

FIG. 7 schematically illustrates a register/clock-generating circuit;

FIG. 8 schematically illustrates an address generating circuit;

FIG. 9 is a truth table of a control circuit;

Figure 11:
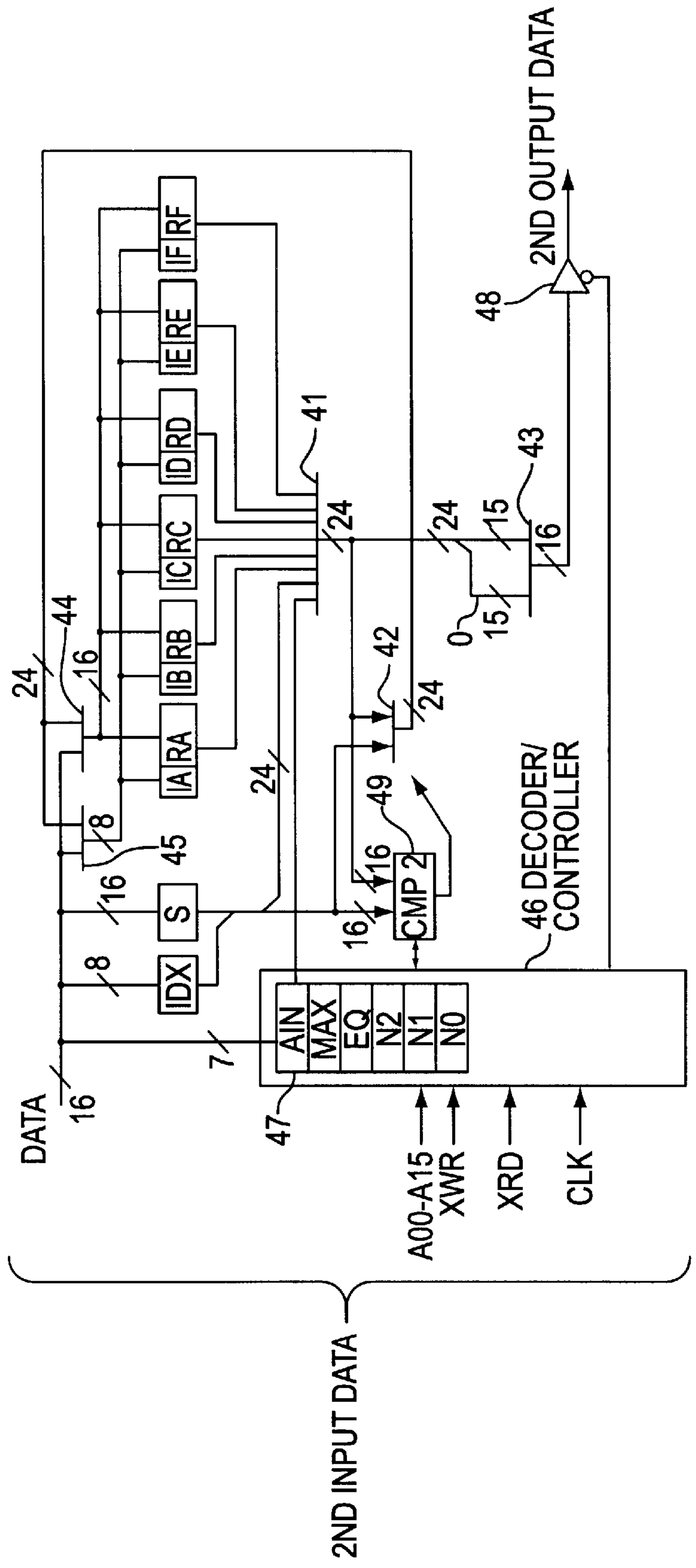
Figure 12:
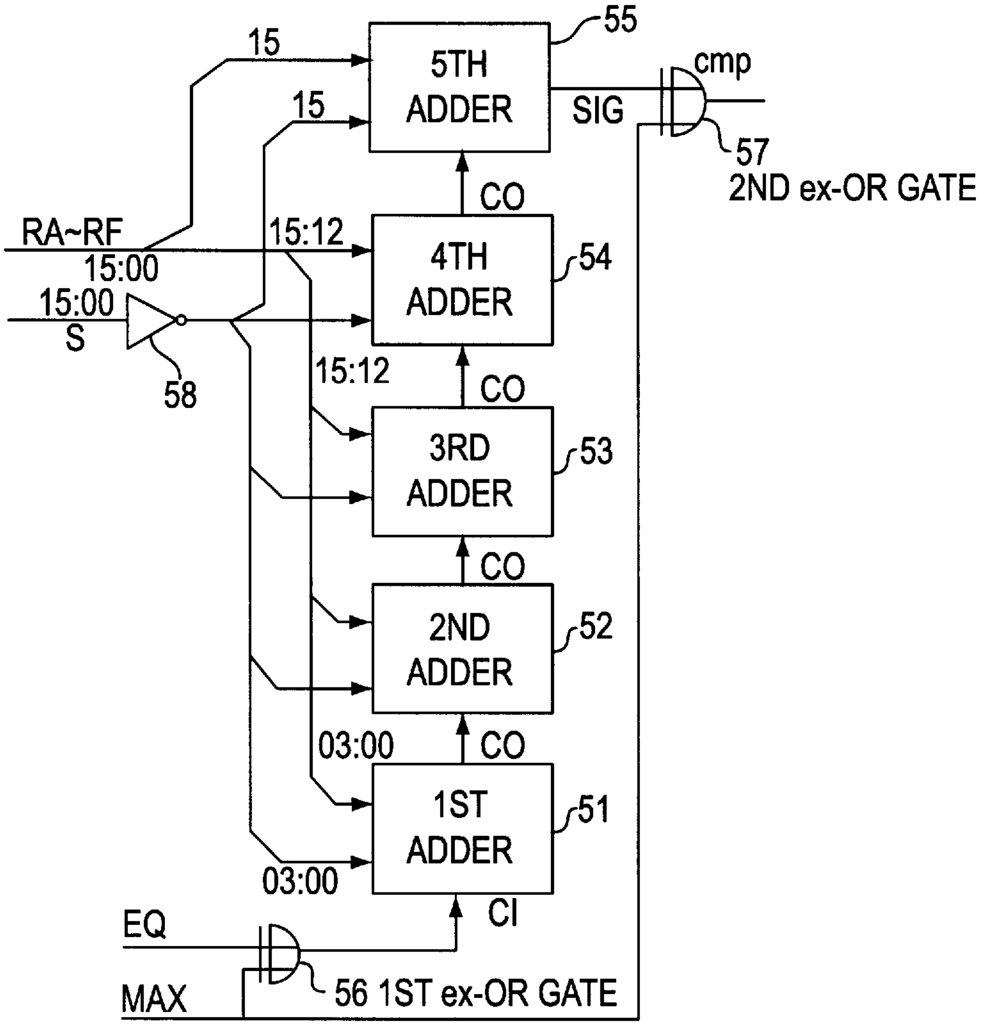
Figure 14:
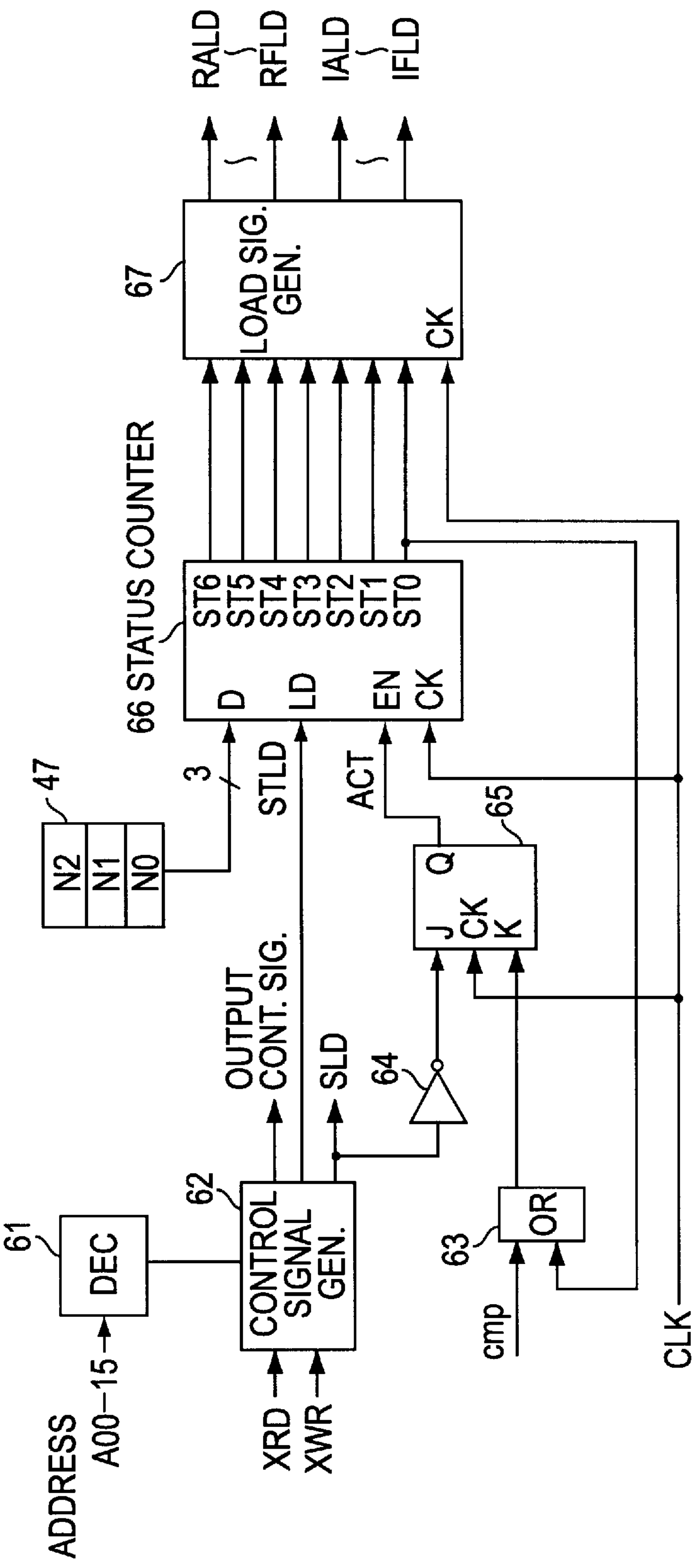
Figure 15:
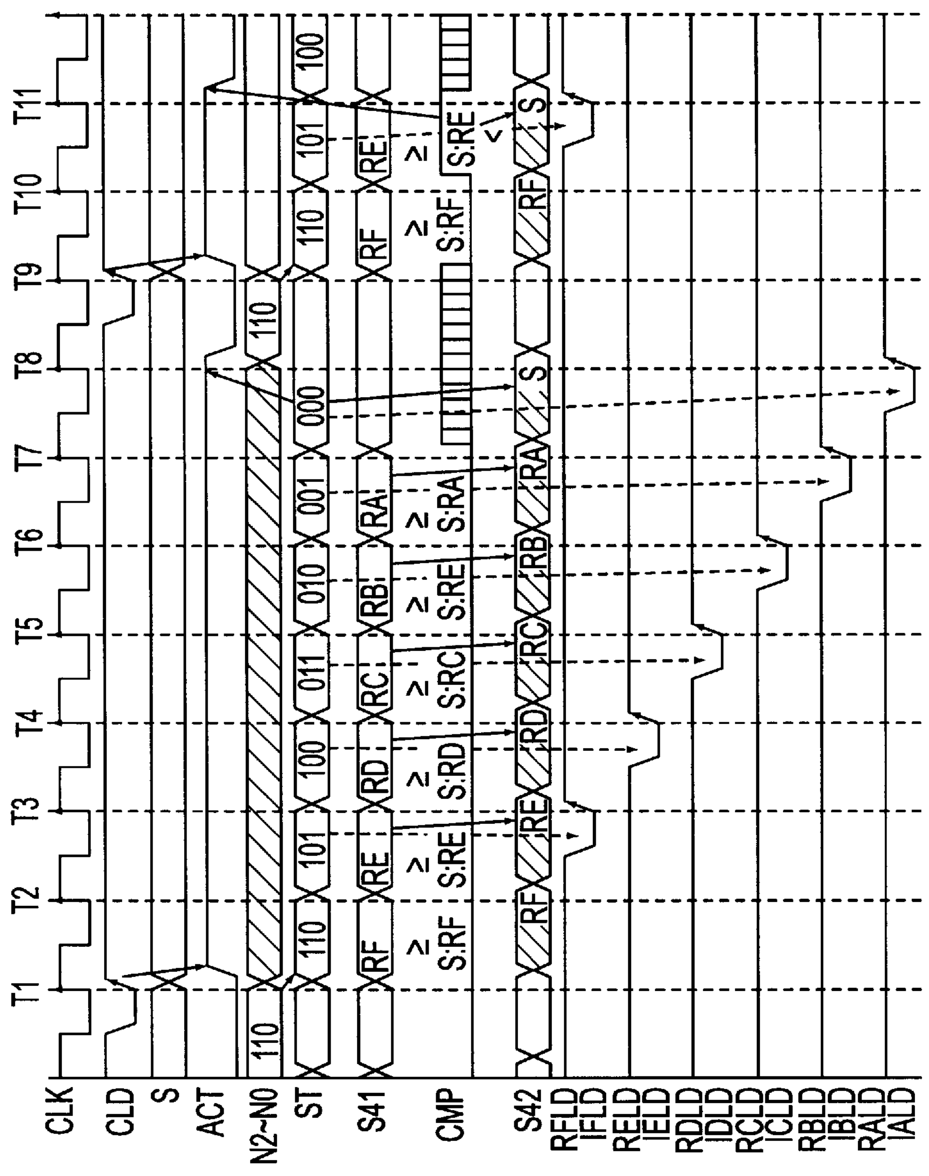
Figure 16:
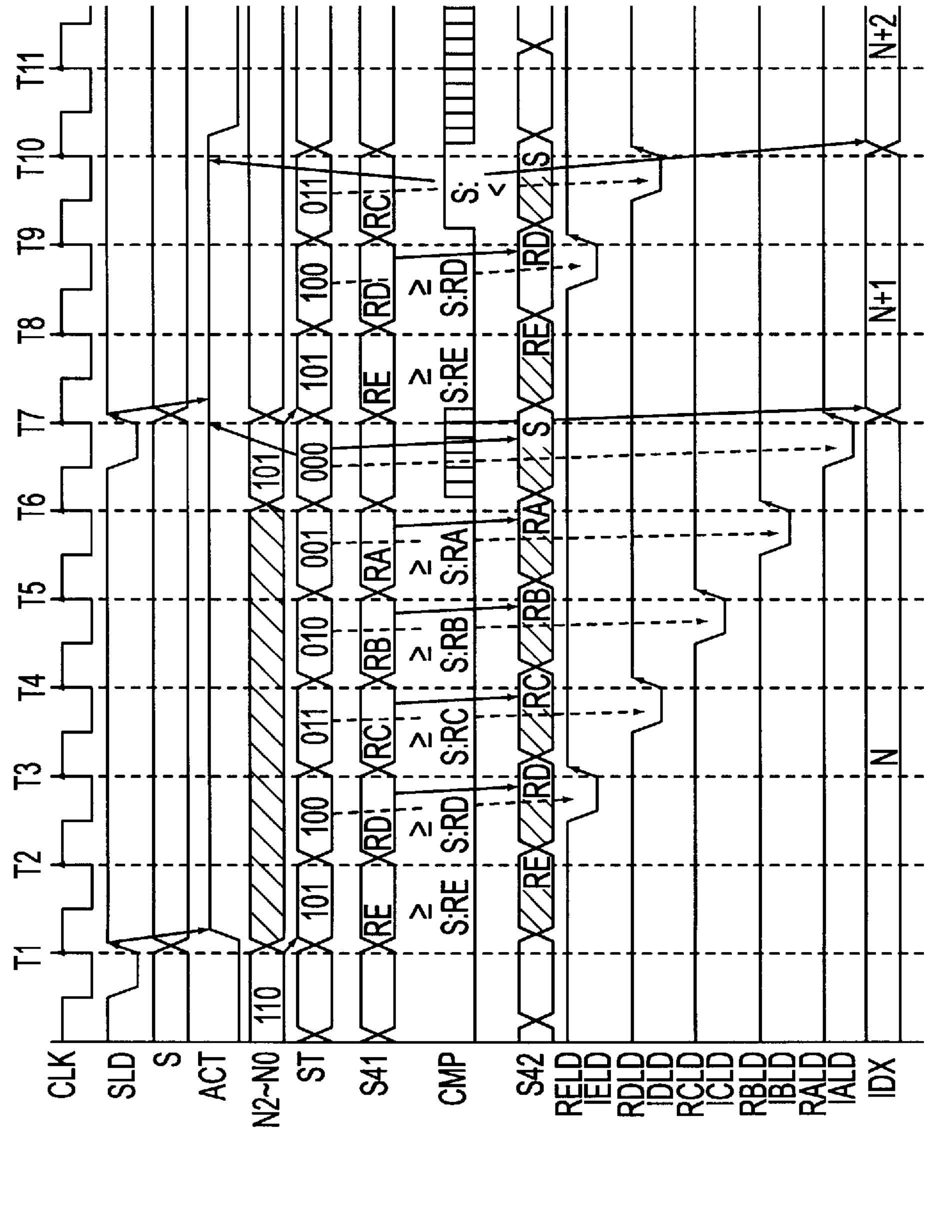
Figure 17:
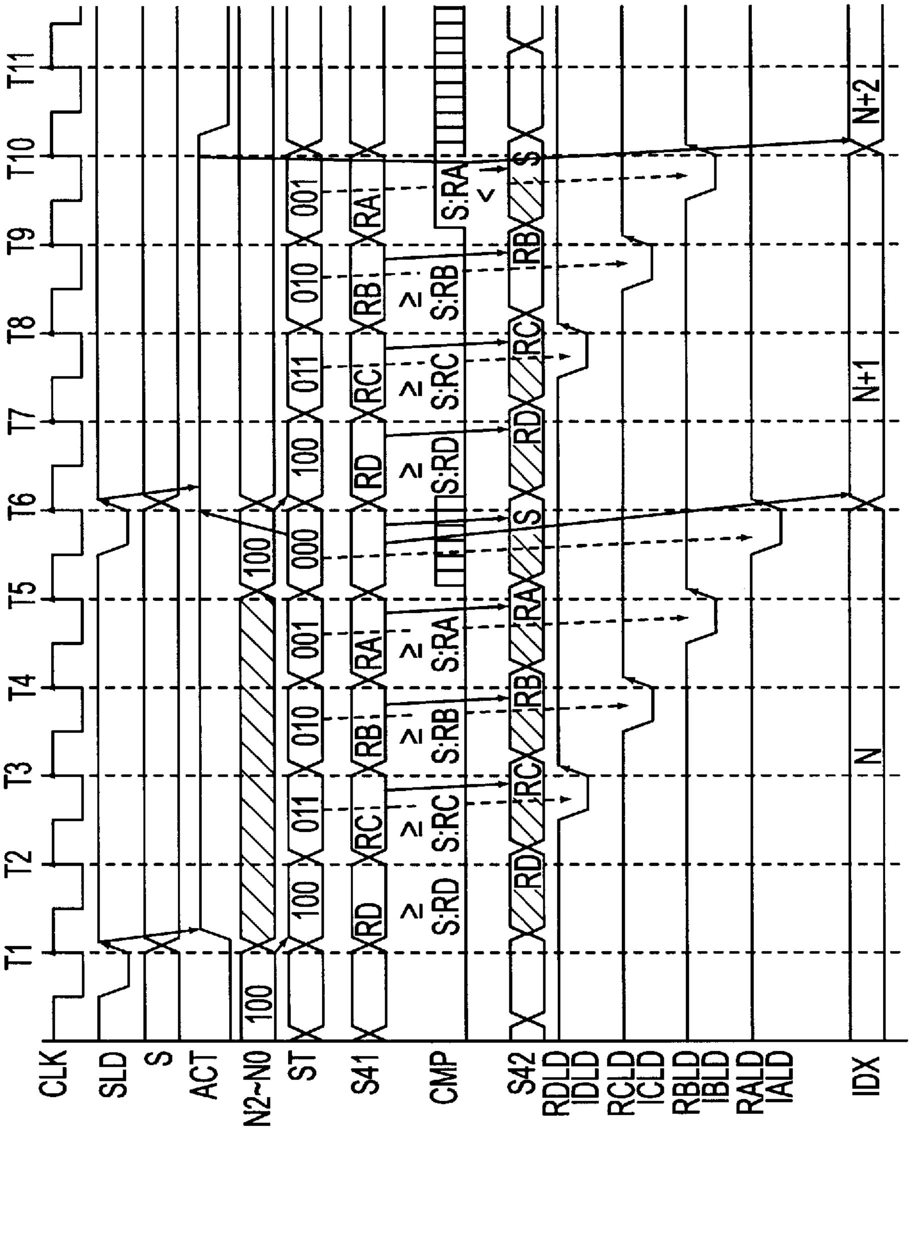
Figure 18:
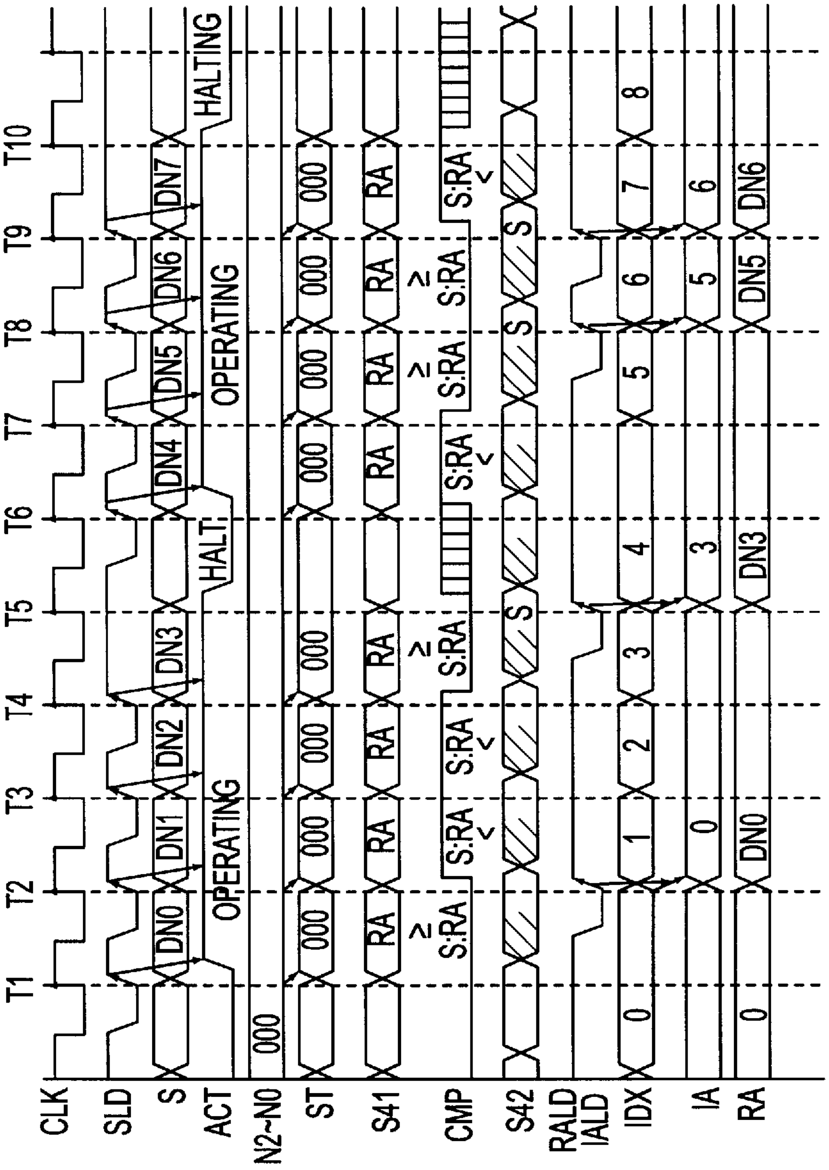
Figure 19:
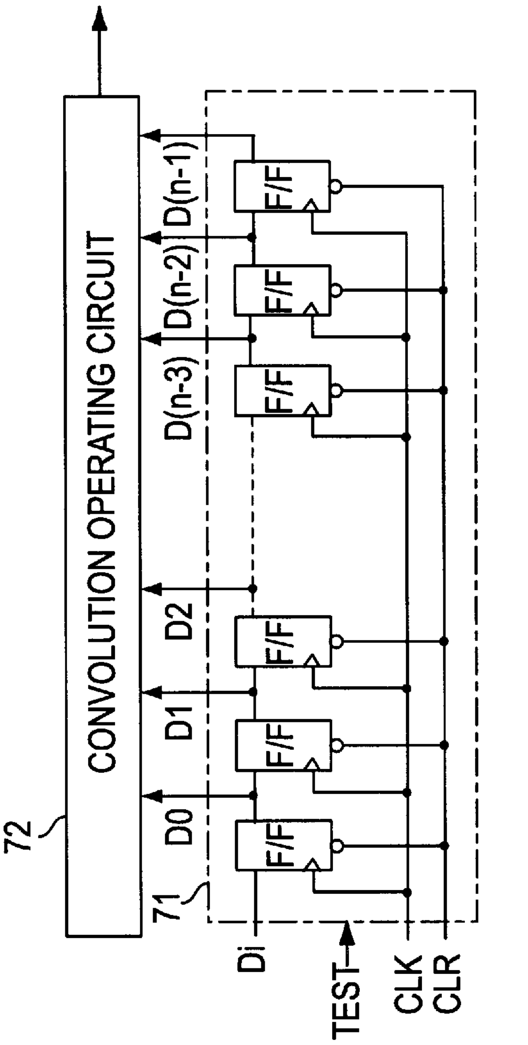
FIG. 19 PRIOR ART
Figure 20:
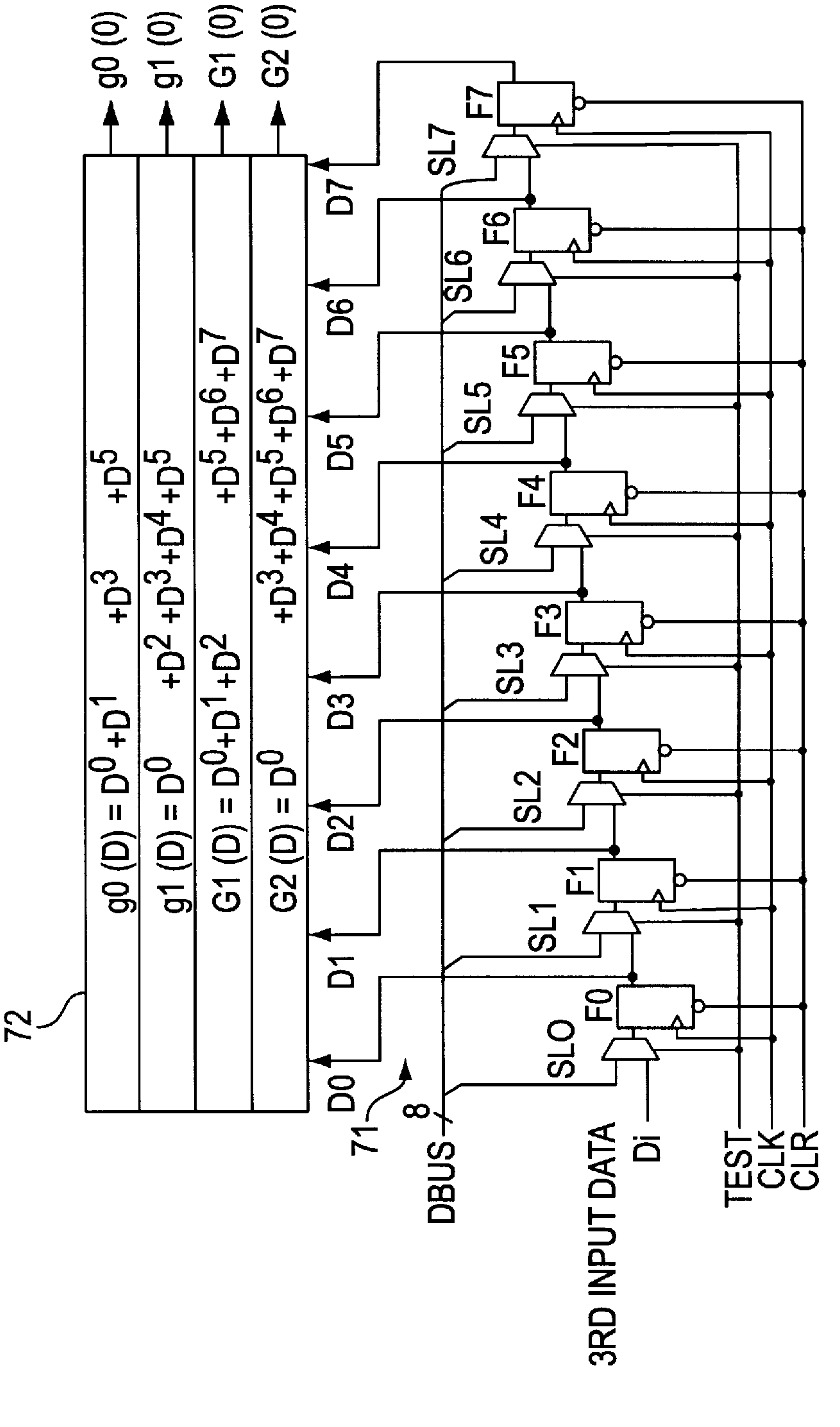
Figure 21:
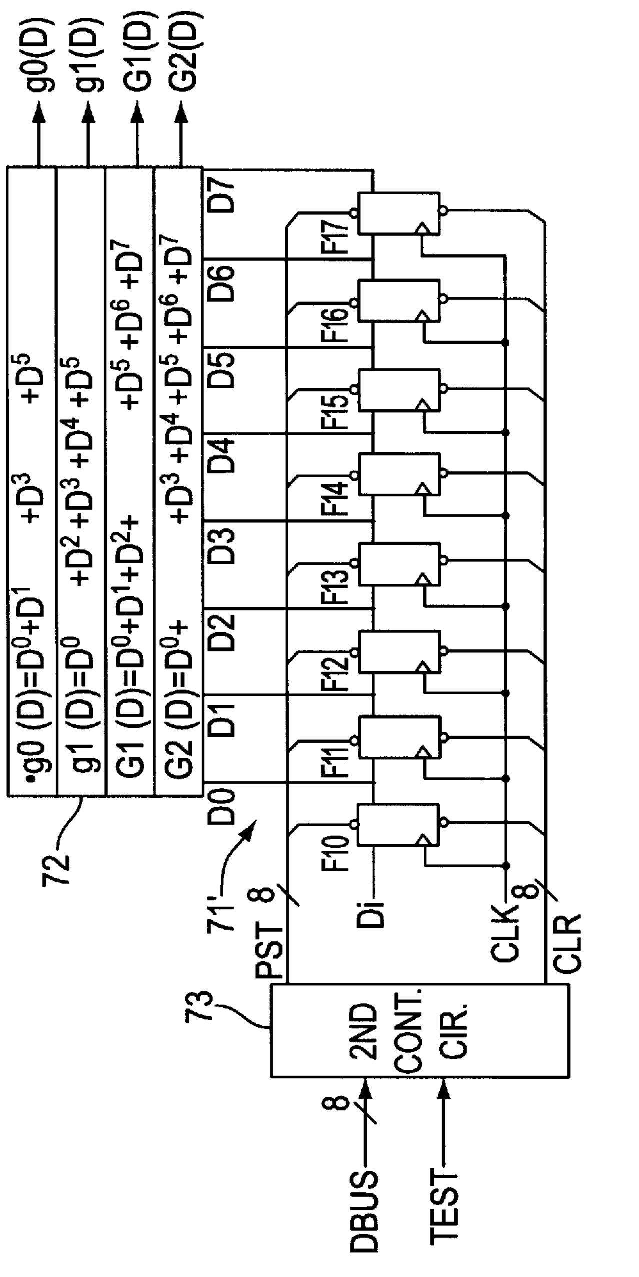

FIG. 11 schematically illustrates data sorting circuit;

FIG. 12 schematically illustrates second comparator;

FIG. 13 shows comparison judgment condition of second comparator;

FIG. 14 schematically illustrates decoder/controller 46;

FIG. 15 is a timing chart to sort six largest data;

FIG. 16 is a timing chart to sort five largest data;

FIG. 17 is a timing chart to sort four largest data;

FIG. 18 is a timing chart to sort the maximum data;

FIG. 19 is a prior art convolution coding circuit;

FIG. 20 is a convolution coding circuit;

FIG. 21 is a variation of convolution coding circuit; and

Figure 22:
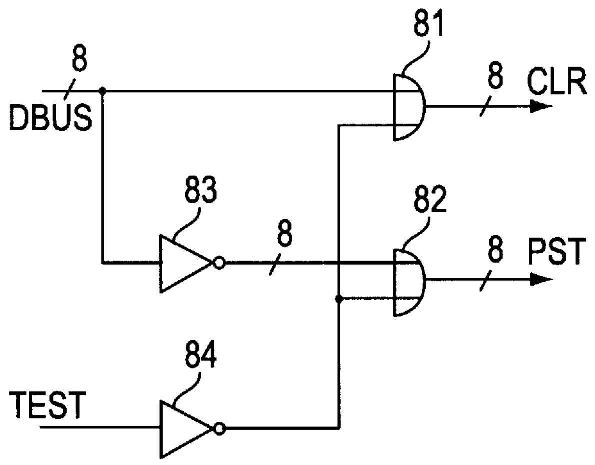

FIG. 22 schematically illustrates second control circuit in convolution coding circuit of FIG. 21.

DESCRIPTION OF THE PREFERRED EMBODIMENT

Figure 1:
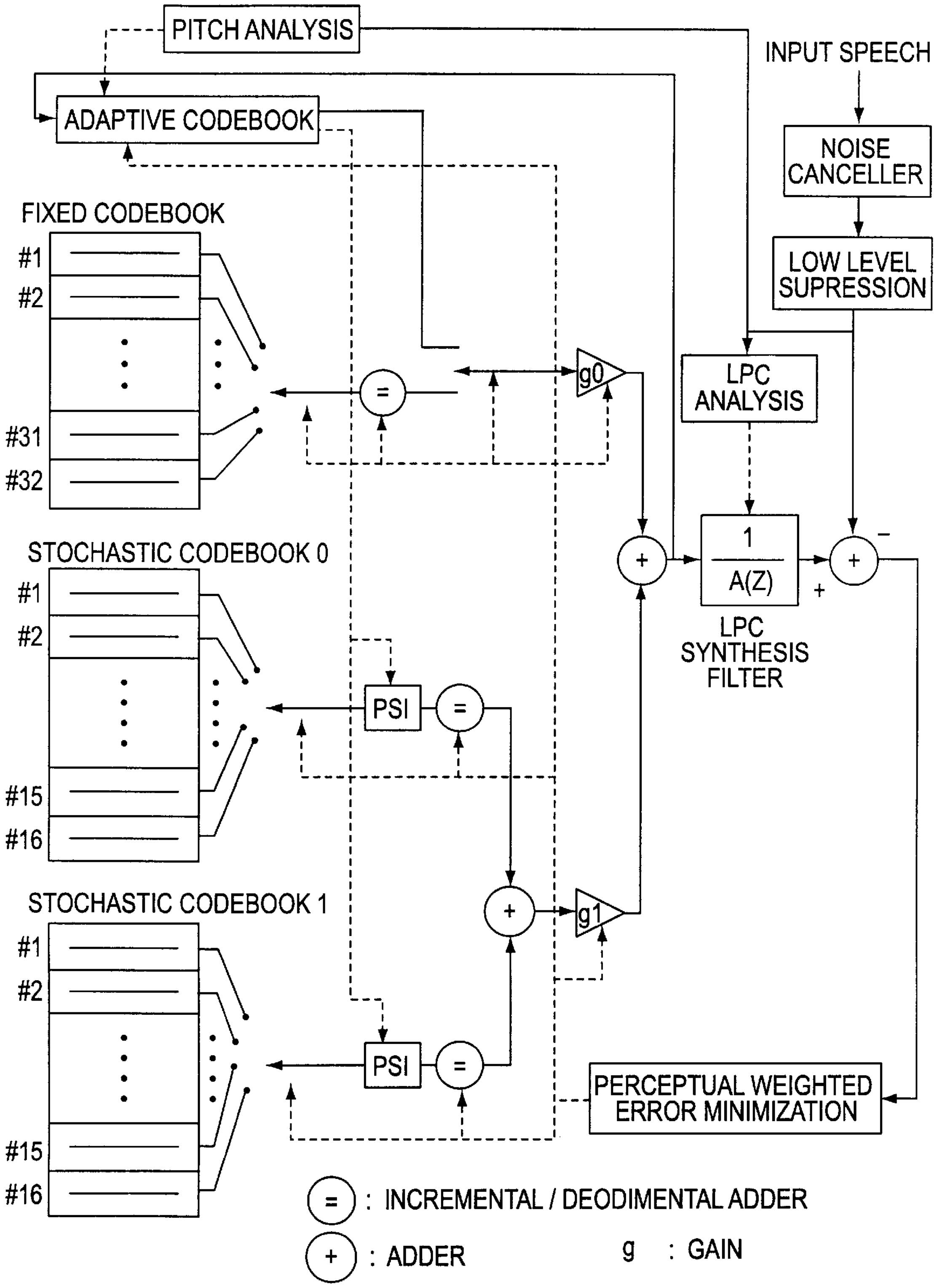
FIG. 1 (PRIOR ART)

An algorithm of the PSI-CELP (Pitch Synchronous Innovation—Code Excited Linear Prediction) cited in above "Description of Related Arts" is shown in FIG. 1 as a coder block diagram and is hereinafter described in detail as one of vector quantizing methods to accomplish a low-bit rate coding for compressing a speech signal, at which the present invention can be typically embodied. The coder block diagram has been disclosed in "Half-Rate Voice CODEC" in "STANDARD SPECIFICATION, RCR STANDARD, RCR STD-27C" in "PERSONAL DIGITAL CELLULAR TELECOMMUNICATION SYSTEM" published by "Research & Development Center for Radio Systems" in Japan on November 1994.

After the input speech is noise-cancelled and low-level-suppressed, a pitch of an A/D (analog to digital) converted input speech PCM (pulse code modulated) signal is analyzed. According to thus analyzed results, a speech component that has a pitch most similar to that of the input speech -is selected out of an adaptive codebook. At the same time, a noise source component in a stochastic codebook is taken out therefrom by the pitch synchronizing process. A speech is synthesized with these speech sources and noise components by the use of a linear predictive synthesis filter, coefficients of which are obtained from linear predictive analysis of the input speech data. For thus synthesized speech data is calculated a perceptual weighted error from the input speech data, whereby the data in the adaptive codebook and in the stochastic codebook is searched while changing the combination of the speech source components in the adaptive codebook and the noise components in the stochastic codebook, in order to produce a synthesized speech that makes the error minimum.

Another purpose of the PSI process is to provide the noise component with synchronized pitch so as to improve the quality of the synthesized speech. Desired noise component is taken out of the stochastic codebook in order to produce a noise component having a pitch cycle approximate to that of the input speech.

In the practice, there is produced a noise component having a pitch cycle for the synthesizing operation in a linear predictive synthesis filter according to a pitch cycle, which will be denoted with I in the below description, resulted from the pitch analysis of the practically input speech, and a datum to appoint the noise component to be taken out, which will be denoted with F in the below description. Moreover, thirty two kinds of data in the stochastic codebook is searched while changing a datum, which will be denoted with N in the below description, in order to find out a synthesized speech data that provides minimum perceptual weighted waveform error compared with the input speech data.

Figure 2:
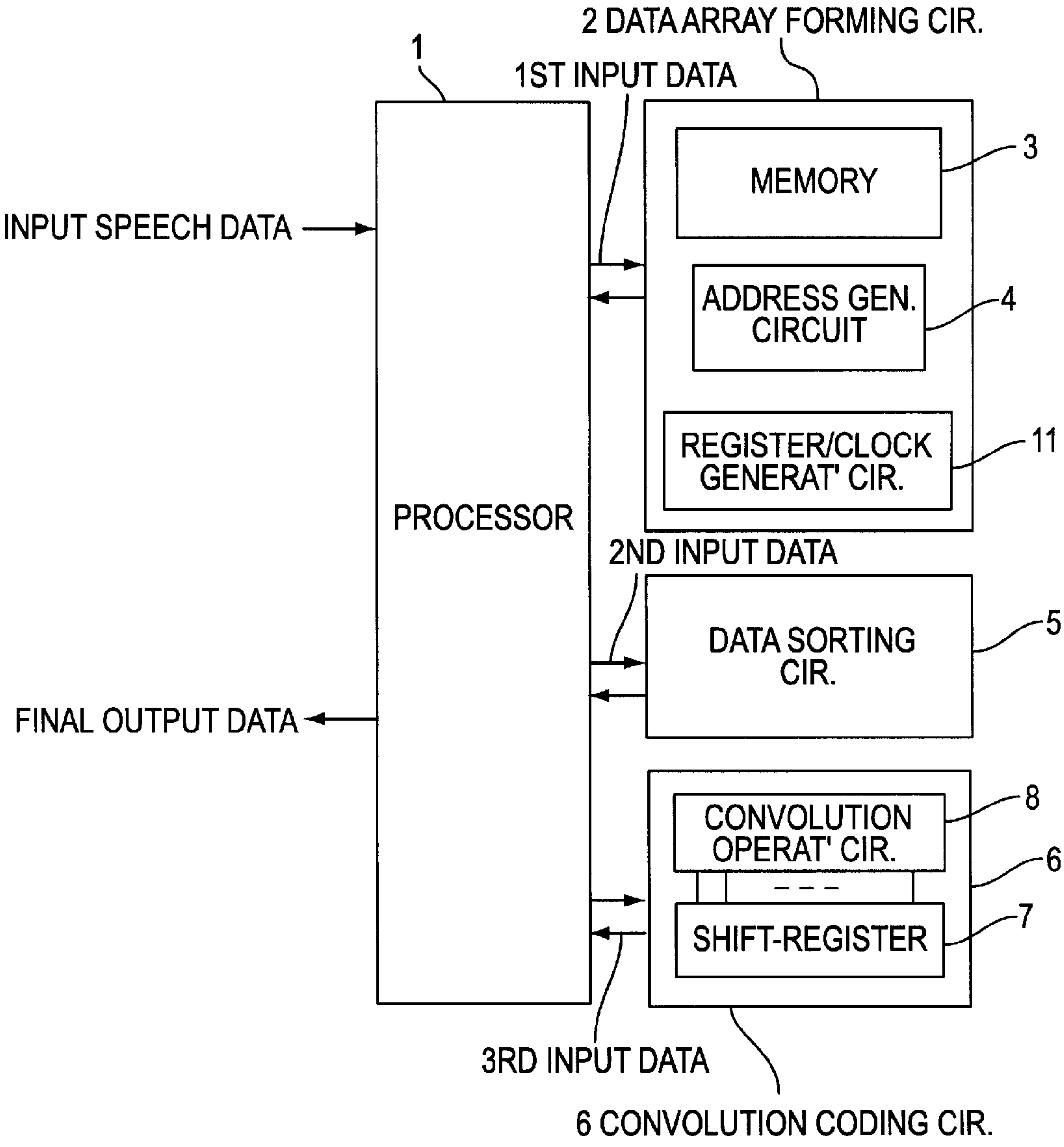

Configuration of a low bit-rate coding system according to the present invention is schematically illustrated in a block diagram of FIG. 2, which includes a processor 1, such as typically called a DSP (digital signal processor), a data array forming circuit 2, a data sorting circuit 5 and a convolution coding circuit 6. Original input data, typically speech data, into the system is compressed, i.e. coded for a low bit rate, as well as convolution coded, and the convolution coded data is output as a final output data from the low bit-rate coding system. Details of each circuit and the operation will be explained later on.

Each of data array forming circuit 2, data sorting circuit 5 and convolution coding circuit 6 is connected with processor 1 by means of common data bus, that is, so-called mapped I/O method. Data PD to be input from processor 1 to each circuit is delivered via the common data bus to one of the circuits, which is specified by an address signal PAD output from the processor. Then, the data is written in the specified circuit by a write signal XWR. Data is read via the data bus into the processor by a read signal XRD, where signal "0" indicates active.

Data array forming circuit is hereinafter described in detail with reference to FIGS. 2 to 10 as a first preferred embodiment of the present invention. The data array forming circuit is to take some part of the PSI algorithm shown in FIG. 1, so as to function to extract the noise component according to data F for every pitch cycle I, i.e. I times, out of the data indicated by N data in the stochastic codebook. Data array forming circuit 2 receives from processor 1 a first input data which carries information regarding the compression, such as I, F and N. Details of data I, F and N will be further explained later on. The noise component data having thus processed pitch cycles are synthesized later to a speech by a linear predictive synthesis filter.

Data array forming circuit 2 includes a memory 3 which stores plural kinds of basic data groups, an address generating circuit 4 which generates addresses for reading blocks, each of which consists of a single or plural word data, from memory 3, so that plural blocks are combined to form a data array without pause.

Figure 3:
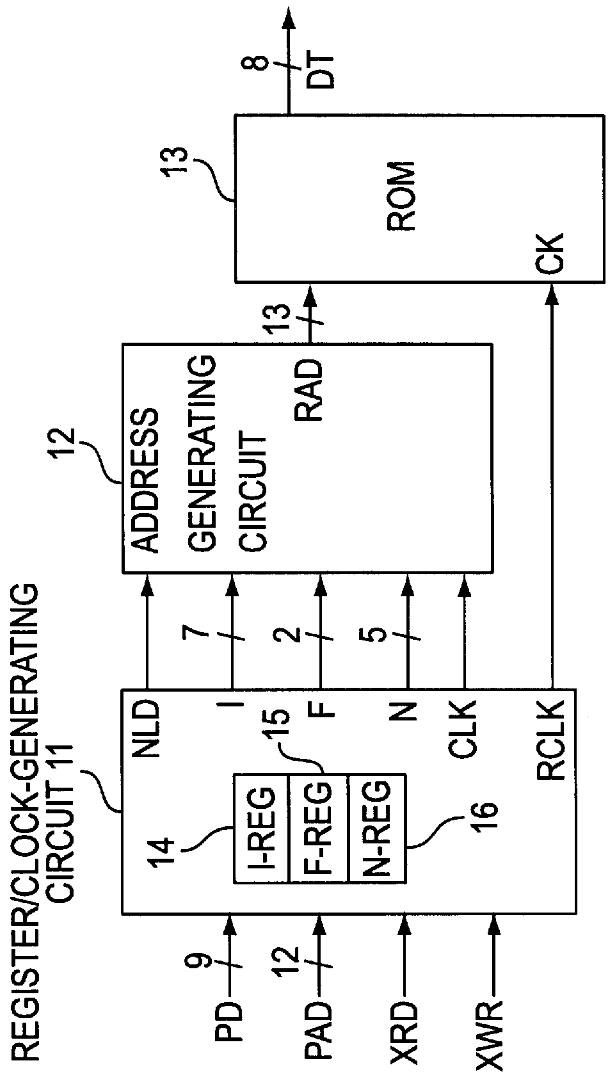

Data array forming circuit 2 is hereinafter described in detail with reference to FIG. 3. The first input data is referred to simply as an input data now in the description of the data array forming circuit. In FIG. 3, the numeral 11 denotes a register/clock-generator circuit; the numeral 12 denotes an address generating circuit which was denoted with the numeral 4 in FIG. 2; and the numeral 13 denotes a memory, which is typically formed of a read-only memory (ROM) and corresponds to memory 3 of FIG. 2. The numerals 14 to 16 denote I, F and N registers (I-REG, F-REG, N-REG), respectively.

Processor 1 operates the above explained algorithm except those operated by the circuits embodied with the present inventions. Data I and F are such that were referred to as lagi(j) and lagf(j), representing an integer part of long term predictive lag candidate and a decimal part of the long term predictive lag candidate, respectively, each of which have been originally disclosed in detail in the above-cited "STANDARD SPECIFICATION, RCR STANDARD, RCR STD-27C" in "PERSONAL DIGITAL CELLULAR TELECOMMUNICATION SYSTEM". Data N is expressed with i in formula 5.2.1.8.5.1.1 of the above SPECIFICATION. First input data from processor 1 to data array formation circuit 2 includes an address signal PAD formed of 12 bits to select I, F and N registers, I-REG, F-REG and N-REG, to which data I, F and N are to be stored, respectively.

The first input data also includes data PD formed of nine bits to carry data I and F, and a read signal XRD or a write signal XWR. I, F or N register 14, 15 or 16 selected by register addressing signal PAD is set with data I, F or N by write signal XWR. At the same time, data I, F and N are input to address generating circuit 12 from respective registers. Data DT read out from memory 13 is sent back to processor 1. Moreover, a first clock signal CLK and a second clock signal RCLK which is used to access the memory device are generated by clock generator (not shown in the figure) in register/clock-generating circuit 11 according to read signal XRD and write signal XWR, and are input to address generator circuit 12 and to memory 13, respectively. Function of register/clock-generating circuit 11 will be explained later further in detail.

Address generating circuit 12 generates a read address signal RAD for reading memory 13 based on load signal NLD, first clock signal CLK each input from register/clock-generating circuit 11, and data I, F and N set in I, F and N registers 14 to 16. Data DT is read out from memory 13 upon read address signal RAD and second clock signal RCLK.

Figure 4:
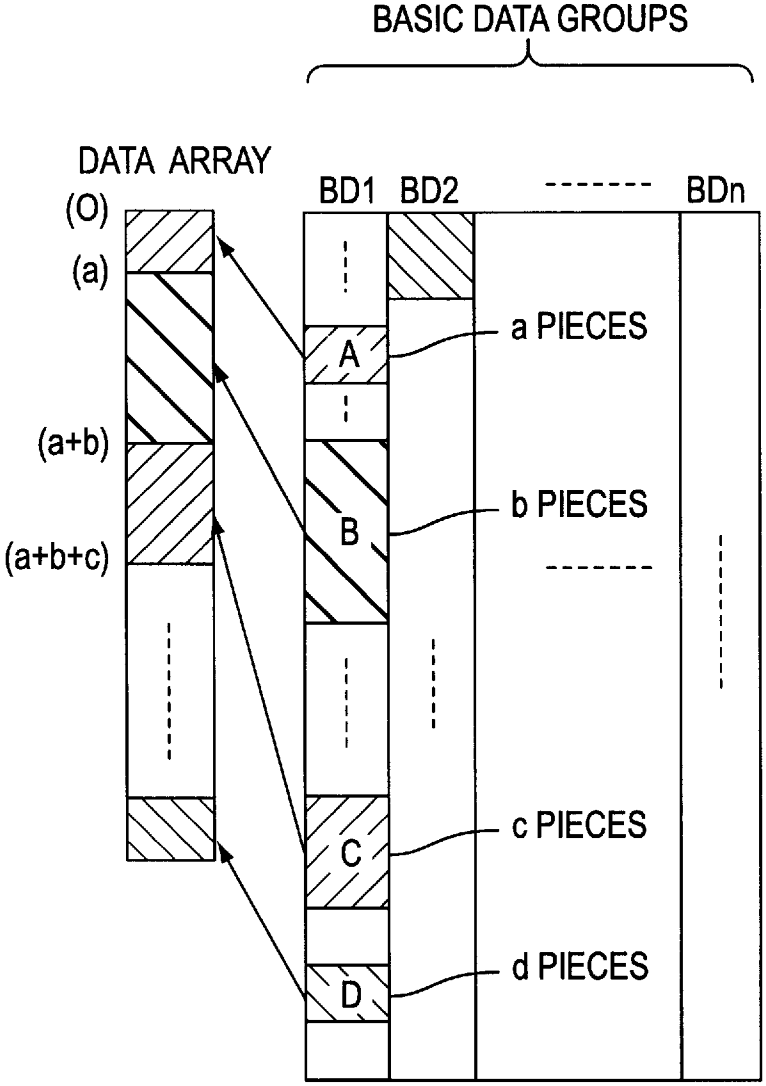

Function of data array formation is hereinafter described in detail with reference to FIG. 4. Memory 13 stores plural kinds of basic data groups BD1–BDn. Each of basic data groups BD1–BDn is composed of respective plural word data. A data array is formed by combining, for instance, a first block A which consists of respectively selected "a" pieces of word data, a second block B which consists of word data of "b" pieces, a third block C which consists of word data of "c" pieces, and a fourth block D which consists of word data of "d" pieces, each read out from basic data groups, for instance, BD1 selected according to input data PD. In the same way, another block which consists of a single or plural word data is read out so that the blocks are combined to form another data array.

In other words, every time word data of a single block is read out of memory 3, the state is transited by the transition means which uses a counter, etc. so that according to the transited state a next head address of the block to be read out is selected by a selector; and according to thus transited state a previously set word data is selected by the selector to be compared with the counted value by the second counter (the read out quantity of word data), whereby addresses of the plural blocks which have non-continuous addresses in the basic data group are generated.

As mentioned above in FIG. 1, the speech data is synthesized in a linear predictive synthesis filter based on this data array, so as to find a residual power error between thus combined data array and the input speech data. The residual power errors are obtained for differently combined data arrays, so that a data array having a minimum residual power error is sorted.

Figure 5:
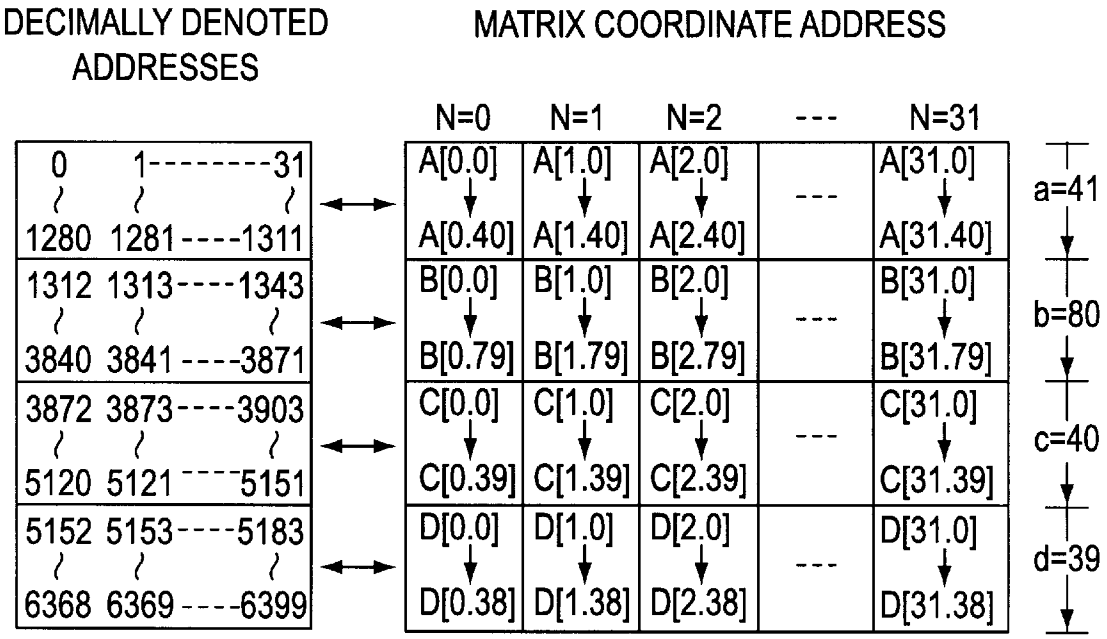

Addressing procedure of memory 13 is hereinafter described in detail with reference to FIG. 5. There is illustrated a case where basic data groups denoted with, for example, N=0 to 31 are stored in memory 13, respectively, and the quantity of word data in each basic data group is 200 (=41+80+40+39 as described below), where memory 13 has address space of 0 to 6399, i.e. 6400=32×200 in total. Each basic data group is illustrated for the case including block A formed of 41 word data, block B formed of 80 word data, block C formed of 40 word data and block D formed of 39 word data. Each address space is denoted with decimal numerals in the left hand side table, and corresponds to each in the right hand side table where the addresses are denoted with matrix coordinates.

FIG. 6 is to explain an address formation rule. For instance, an address denoted with B[N,0], etc. are generated according to state transitions 0 to 5 and data I, F and N set in I, F and N registers 14 to 16. In this case, if it is assumed that N=0, address B[N,0] indicates the head of B block of the basic data group of N=0 in the right hand side table of FIG. 5.

Figure 7:
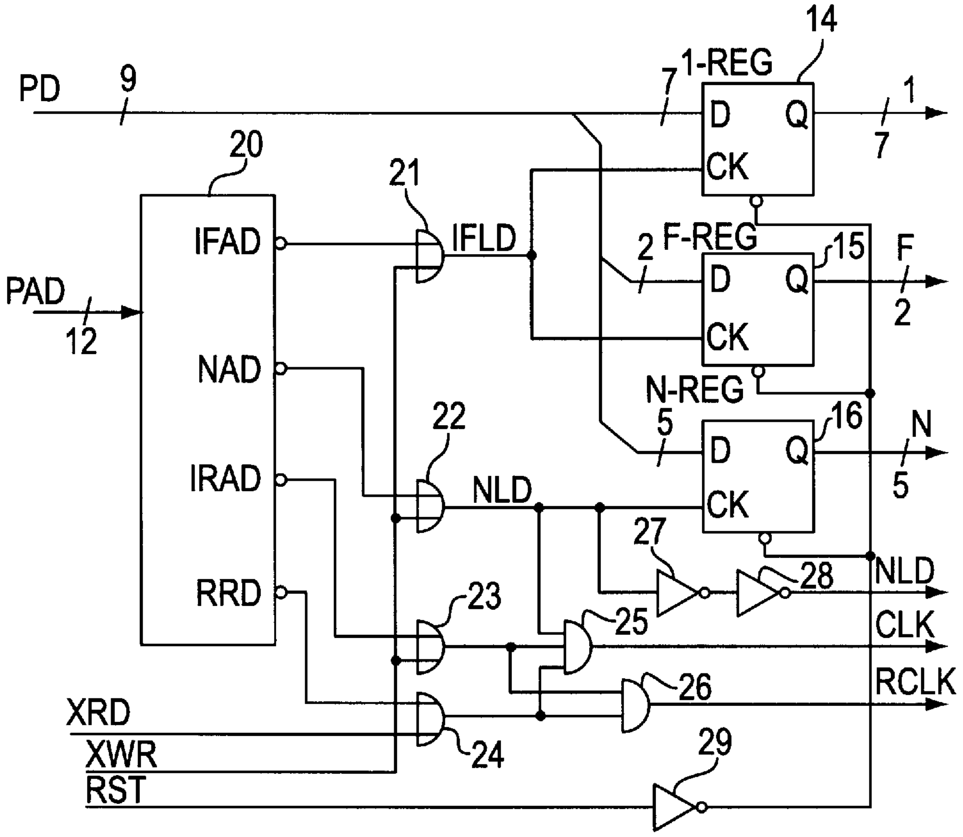

FIG. 7 schematically illustrates a circuit diagram of register/clock-generating circuit 11. The numeral 20 denotes a decoder, the numerals 21–24 denote OR gates, the numerals 25 and 26 denote AND gates, and the numerals 27 to 29 denote inverters.

Register addressing signal PAD formed of parallel 12 bits, denoted with 11:00 (which means from the 11th to the 0th bit), from the processor is decoded by decoder 20 so as to output an I/F register selecting signal IFAD to select one of I and F registers 14 and 15, an N register selecting signal NAD to select N register 16, and an either of register initialization signal IRAD to initialize the registers or a read signal RRD to read the data in memory 13, as "0". A write signal XWR ("0") output from processor 1 is input via OR gate 21 as an I/F register loading signal IFLD ("0") to clock terminals CK of I and F registers 14 and 15, and via OR gate 22 as an N register loading signal NLD ("0") to clock terminal CK of N register 16, AND gate 25 and inverter 27.

I, F and N registers 14–16 are reset by reset signal RST ("0") from processor 1. Seven bits at 06:00 (from the 6th to the 0th) of input data PD are loaded into I register 14 by the rise of first loading signal IFLD from "0" to "1", then two bits at 08:07 (the 8th and the 7th) of input data PD are also loaded into F register 15. Five bits at 04:00 (from the 4th to the 0th) of input data PD are loaded into N register 16 by the rise of second loading signal NLD from "0" to "1". N register loading signal NLD is also input via inverters 27 and 28, which are for adjusting the phase, to address generating circuit 12. First clock signal CLK is input via AND gate 25 to address generating circuit 12; and second clock signal RCLK is input via AND gate 26 to memory 13.

Figure 8:
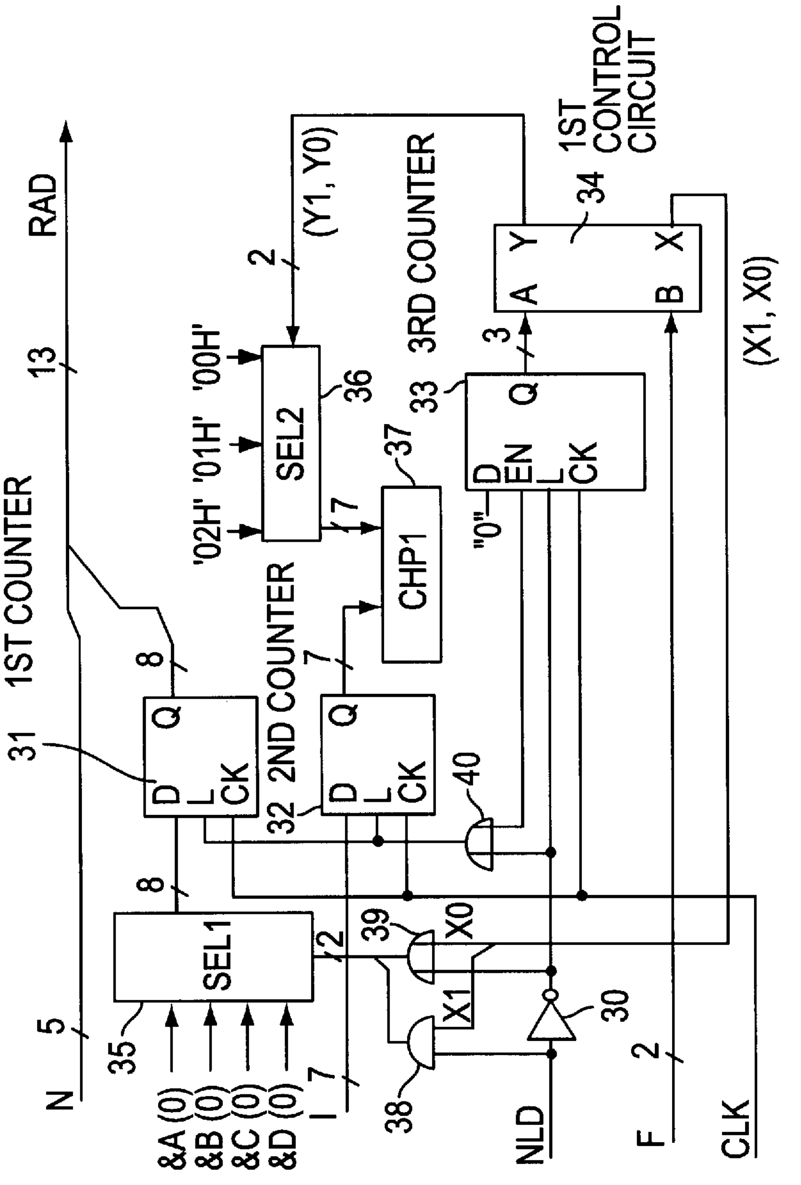

FIG. 8 schematically illustrates a circuit diagram of address generating circuit 12. The numeral 30 denotes an inverter, the numeral 31 denotes a first counter for up-counting, the numeral 32 denotes a second counter for down-counting, and the numeral 33 denotes a third counter which shows a state transition by up-counting. The numeral 34 denotes a first control circuit, function of which will be described later, and the numerals 35 and 36 denotes a first and second selector (SEL1, SEL2), respectively. The numeral 37 denotes a first comparator (CMP1), the numeral 38 denotes an AND gate, and the numerals 39 and 40 denote OR gates.

Input to address generating circuit 12 are data N of five bits from N register 16, data I of seven bits from I register 14 and data F of two bits from F register 15, second loading signal NLD and first clock signal CLK. First selector 35 selects one of head addresses &A[0] to &D[0] in the blocks of memory 13 according to the two bits formed of the output signal of AND gate 38 and the output signal of OR gate 39, so as to set in first counter 31. In this case, head addresses &A[0], &B[0] and &C[0] are selectively output by the two bits "00", "01" and "10", respectively. Read address signal RAD of memory 13, that is an output of address generating circuit 12, formed of 13 bits in total at 12:00 is formed of data N of five bits at 04:00 and first counter's count of eight bits at 12:05.

First control circuit 34 receives the three-bit count of third counter 33 and data F of two bits from F register 15 respectively to terminals A and B, so as to output data (X1, X0) and (Y1, Y0) each of two bits from terminals X and Y, respectively, in accordance with a truth table shown later in FIG. 9. First and second selectors 36 and 37 are controlled by the data from terminals X and Y of first controller 34, respectively.

FIG. 9 shows a table typically specifying the function of control circuit 34. Data F input to terminal B from register 15 is described with two bits, B1 and B0; and the count of third counter 33 input to terminal A is described with three bits, A2, A1 and A0. Outputs from terminals X and Y are described with two bits, X1, X0 and Y1, Y0, respectively. In other words, the change in the outputs from terminals X and Y at the transition states 1 to 6 shown with three bits A2, A1, and A0 are given there for F=0 to F=3. First control circuit 34 performing the logic operation given in FIG. 8 is easily accomplished with comparatively simple logic circuits.

Second counter 32 set with I data of I register 14 counts down so that the content of counter 32 is compared by first comparator 37 with the value selected by second selector 36. On a equality comparison result at the comparison a third counter 33 is enabled to count up by first clock signal CLK so as to indicate the state transition caused by the counted value. In this case, second selector 36 selects '00H' (=0), '01H' (=1) and '10H' (=2), when the two-bit outputs (Y1, Y0) from terminal Y of control circuit 34 are "00", "01" and "10", respectively, so as to be input to first comparator 37.

Now, the quantity of the word data thus determined by second selector 36 and the quantity of the word data specified by data I are compared with each other by first comparator 37, so that I pieces of word data, (I+1) pieces of word data and (I−1) pieces of word data are read out, respectively, when selector 36 selects '00H', '01H' and '10H'. That is, it is specified according to the addressing rule that the addresses are generated until the specified quantity of word data from the head of the block are read out.

Figure 10:
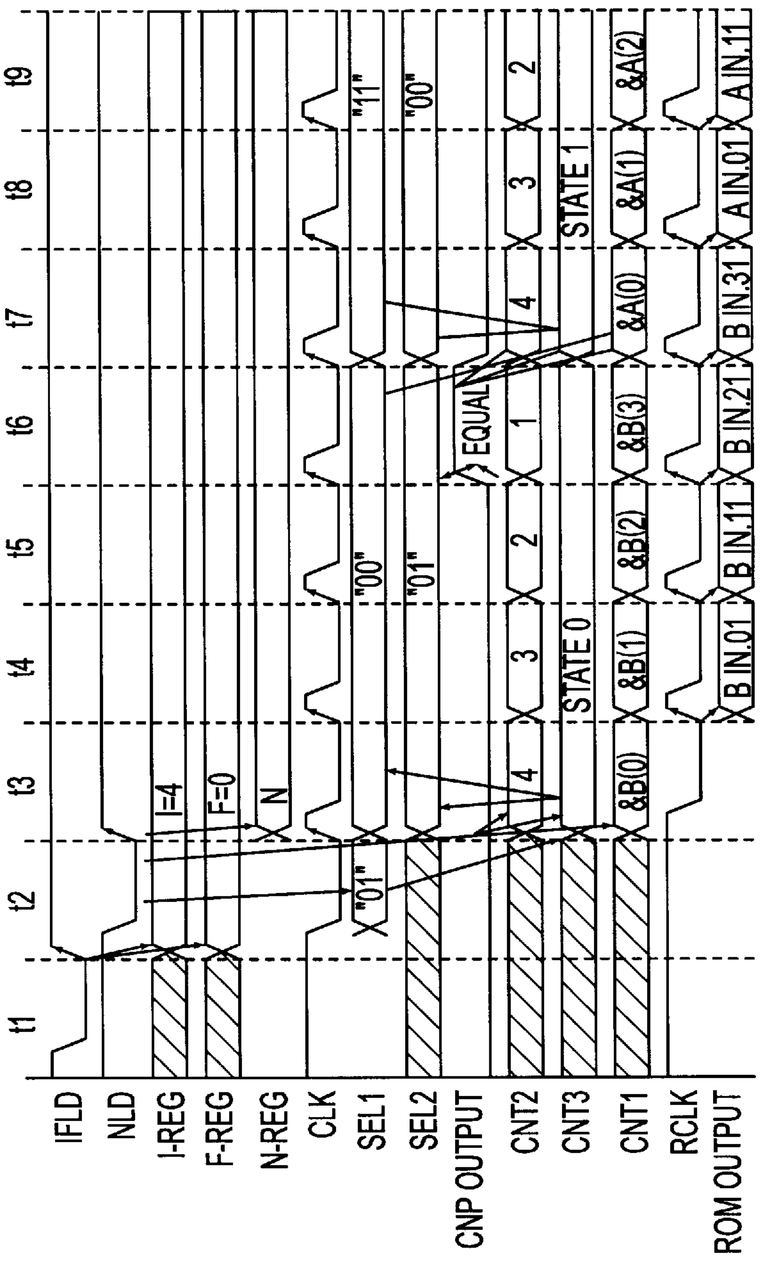
FIG. 10 is a timing chart of address formation.

FIG. 10 schematically illustrates a timing chart of the address formation of the first preferred embodiment of the present invention. IFLD denotes an I/F register loading signal from OR gate 21; NLD denotes an N register loading signal from OR gate 22; I-REG, F-REG, and N-REG denote the contents of I, F and N registers 14, 15, and 16, respectively; CLK denotes first clock signal from AND gate 25; SEL1 and SEL2 denote the selected outputs of first and second selectors, 35 and 36, respectively; CMP OUTPUT denotes the compared output of comparator 37; CNT1 to CNT3 denote counted value of first to third counters 31 to 33, respectively; RCLK denotes the second clock signal to the ROM from AND gate 26; and ROM OUTPUT denotes the data read out from memory 13. Hereinafter described are operations of above FIGS. 3 to 9.

During a period t1 the contents I-REG of I register 14, F-REG of F register 15 and N-REG of N register 16, output SEL2 of second selector 36, count values CNT1 to CNT3 of counters 31 to 33 are undetermined as indicated with hatching in FIG. 10. However, when register addressing signal PAD from the processor is decoded in decoder 20 to provide I/F register selecting signal IFAD and write signal XWR respectively with "0", I/F register load signal IFLD becomes "0", and then, seven bits at 06:00 in data PD formed of nine bits at 08:00 from the processor are applied to I register 14, and two bits 08:07 are applied to F register 15. On rise of I/F register loading signal IFLD during the subsequent period t2, I register and F register are loaded with, for example, I=4 and F=0, respectively.

During period t2, register addressing signal PAD is decoded by decoder 20 to provide N register addressing signal NAD and write signal XWR respectively with "0" so that N register loading signal NLD from OR gate 22 becomes "0". Accordingly, AND gate 38 outputs "0", and OR gate 39 receiving its input via inverter 30 outputs "1", where these two signals form two bits "01" so that first selector 35 selects the second input thereto &B(0) from four head addresses as shown with SEL1. Then, N register loading signal NLD becoming "0" provides first clock signal CLK output from AND gate 25 with "0".

During the subsequent period t3, when N register loading signal NLD rises from "0" to "1" N data, that is five bits 04:00 in input data PD from the processor, is loaded into N register as shown with N-REG. When N register loading signal NLD is "0", which is then inverted to "1" input as a load signal to load terminals L of first and second counters 31, 32, and 33, the rise of N register loading signal NLD allows head address &B[0] formed of eight bits selected by first selector 35 to be loaded into first counter 31, data I of seven bits to be loaded from I register 14 into second counter 32, and "0", which indicates to clear, to be loaded into third counter 33. When a read signal RRD decoded from register addressing signal PAD by decoder 20 becomes "0", first clock signal CLK and second clock signal RCLK become "0". Since, every time read signal RRD signal allows to read out word data from memory 13 first and second clock signals CLK and RCLK once having become "0" rise up to "1".

Then, counted value of third counter 33 is "0" while F has been 0; accordingly, inputs to terminals A and B of first control circuit 34 are both "0". Then, as shown at the upper most of (1) for F=0 in FIG. 9 the two bits, X0, X1, at terminal X become "0", and the two bits, Y1, Y2, at terminal Y become "01". Therefore, second selector 36 selects output '01H' to indicate 1. Thus, period t3 is an initialization period.

During the subsequent period t4, word data is read out from head address &B[0,0] of memory 13 by the rise of first and second clock signals, CLK and RCLK, from "0" as denoted with B[N,0] of the ROM OUTPUT in FIG. 10. Second counter 32 counts down to count three. Third counter 33 does not count up because enable terminal EN has been "0"; accordingly, the state exhibits 0. First counter 31 counts up to output &B[1].

During the subsequent period t5, word data is read out of memory 13 by reading the dresses &B[1] counted by first counter 31 and N=0 as shown with B(N,1) in ROM OUTPUT. Second counter 32 counts down to output two, while first counter 31 counts up to output &B[2].

During the subsequent period t6, word data is read out of memory 13 by reading the addresses &B[2] counted by first counter 31 and N=0 as shown with B(N,2) in ROM OUTPUT. Second counter 32 counts down to count one, while first counter 31 counts up to output &B[3].

At this time, first comparator 37 outputs a comparison match signal, i.e. an equality signal, "1" because the outputs selected by second selector 36 and the counted value of counter 31 are equal, whereby enable terminal EN of third counter 33 receives "1"; and a loading signal of "1" is made to input via OR gate 40 to load terminals L of first and second counters 31 and 32. At this time, the head address &A[0] is selectively output by first selector 35, because X1 and X0 output from terminal X of control circuit 34 is "00".

During the subsequent period t7, word data is read out of memory 13 by reading the address &B[3] counted by first counter 31 and N=0 at the rises of first and second clock signals, CLK and RCLK, as shown with B[N,3] in ROM OUTPUT. Third counter 33 counts up so as to make the state 1. First counter 31 is loaded with head address &A[0]. Second counter 32 is loaded with data I=4 of first register 14.

The state transition of third counter 33 causes X1 and X0 at terminal X of first control circuit 34 to become "11", and Y1 and Y0 at terminal Y to become "00". Therefore, first selector 35 selectively outputs a fourth head address &D[0], and second selector 36 selectively outputs 0.

During the subsequent period t8, word data is read out of head addresses of block A of memory 13 as shown with A[N,0]. In the subsequent cycles word data are read out of memory 13 by the operations similar to those of the above-mentioned cycles. Then, when F=0, read address signal RAD in this case successively accesses blocks B, A, D, C, and B according to states 0 to 4 as shown in FIG. 6. When F=1, read address signal RAD is such as to access B block at any of states 0 to 4. When F=2, read address signal RAD is such as to successively access blocks B, C, D, A, B, and C RAD is such as to successively access blocks B, D, B, D, B, and D according to states 0 to 5.

As described above, the basic data groups N=0 to 31 can be selected by five-bit data N loaded in N register 16, and the word data in the basic data groups can be selected by the eight-bit count value of first counter 31. Accordingly, the relatively complex address to read out a predetermined word data from memory which stores plural kinds of basic data group can be easily accomplished with the relatively simple circuit configuration. The head address of blocks can be determined by comparing the predetermined quantity of word data in the blocks selected by first selector 35 with the value selected by the count of second counter 32 and second selector 36. Thus, an arbitrary number of word data can be generated by specifying the value of I from the processor.

Data sorting circuit 5 is to take some part of the algorithm of perceptual weighted error minimization shown in FIG. 1. Data sorting circuit 5 receives a second input data which is the result of a predetermined operation of processor 1 together with data array forming circuit 2, where the predetermined operation is such that, for example, after processor obtains a residual power error between the input speech data and a data array of data read out from a code book in accordance with the input speech data, the data of the residual power error are successively input to the present data sorting circuit 5. The minimum value data or a predetermined number of data taken out in an ascending order from the minimum value, or the maximum value data or a predetermined number of data taken out in descending order from the maximum value, whereby at least the perceptual weighted error between the synthesized speech and the originally input speech data is automatically sorted in descending order.

FIG. 11 schematically illustrates a circuit diagram of data sorting circuit 5, which was denoted with the numeral 5 in FIG. 2. The second input data, referred to in the detailed description of this data sorting circuit simply as an input data, is typically formed of sixteen bits, where the index is formed of eight bits to express decimal values from 0 to 255. Notations RA to RF denote registers to store sixteen bit data from the maximum or minimum to the sixth place; notations IA to IF denote index registers to store eight bit index information of respective data registers RA–RF; notation S denotes an S register to store a sixteen bit input data; notation IDX denotes an index register to store the input eight bit index; the numerals 41–47 denote first to seventh selectors; the numeral 46 denotes a decoder/controller circuit; the numeral 47 denotes a mode register; the numeral 48 denotes a gate; and the numeral 49 denotes a first comparing circuit. Outputs from registers RA–RF, IDX and S are selected by a third selector 41.

Input to decoder/controller 46 are address signals carried in PAD of 16 bits at A00–A15, write signal XWR or read signal XRD from processor 1, and first clock signal CLK from register/clock generator circuit 11, so that sorting condition, etc. is set in mode register 47. Data AIN carried by input data and stored in mode register 47 specifies an automatic updating of the index. AIN="1" indicates that the index is to be updated automatically when the sorting is finished, while AIN="0" indicates no updating. Data MAX and data EQ stored in mode register 47 indicate modes of the comparing process, so that, for example, the following conditions be specified.

| MAX | EQ | Operation | Sorting Condition |
|---|---|---|---|
| 0 | 0 | Sort the minimum | S < RA -- RF |
| 0 | 1 | Sort the minimum | S ≦ RA -- RF |
| 1 | 0 | Sort the maximum | S > RA -- RF |
| 1 | 1 | Sort the maximum | S ≧ RA -- RF |

Data N2–N0 carried by the input data specifies the quantity of the data to be taken out after the sorting process is finished, as hereinafter shown as an example.

| N2 | N1 | N0 | Sorting Order | Process Cycles |
|---|---|---|---|---|
| 0 | 0 | 0 | Sort only the first place | One cycle |
| 0 | 0 | 1 | Prohibited | |
| 0 | 1 | 0 | Sort up to the second place | Three cycles |
| 0 | 1 | 1 | Sort up to the third place | Four cycles |
| 1 | 0 | 0 | Sort up to the fourth place | Five cycles |
| 1 | 0 | 1 | Sort up to the fifth place | Six cycles |
| 1 | 1 | 0 | Sort up to the sixth place | Seven cycles |

Second comparator 49 receives the comparison judgment conditions from decoder/controller circuit 46 so as to compare the input data stored in register S and the contents of registers RA–RF successively selected by third selector 41. Third to seventh selectors 41–45 are controlled as described later by comparison judgment output of second comparator 49 or decoder/control circuit 46.

For instance, in the case where the input data and the stored in registers RA–RF are compared by second comparator 49 so as to set the maximum data in A register RA, then if the input data is smaller than the data stored in A register RA and is larger than the data stored in B–F registers RB–RF, the input data be set in B register RB. The currently input data is the second largest, i.e. of the second place, from the maximum, the highest place.

FIG. 12 schematically illustrates the detail of second comparator 49 employed in the first preferred embodiment of the present invention. The numerals 51–54 denote four adders (ADD), respectively, each of four bits, each for outputting only a carry signal co. The numeral 55 denotes a fifth adder (ADD) to output a sign bit SIG. The numerals 56 and 57 denote first and second exclusive OR gates; and the numeral 58 denotes an inverter 58. Input data at 15:00 of 16 bits from register S is inverted by inverter 58, and four bits of the 16 bits are input respectively to a first input terminal of first to fourth adders 51–54. Four bits in the 16 bit data at 15:00 successively selected by the third selector 41 are also input from registers RA–RF to a second input terminal of first to fourth adders 51–54, so that a subtractions are carried out therein.

In other words, out of the 16 bit signal of S register S, four bits at 03:00 are input to a first adder 51, four bits at 07:04 are input to a second adder 52, four bits at 11:08 are input to a third adder 53, and four bits at 15:12 are input to a fourth adder 54. An exclusive OR of data EQ and MAX from mode register 47 are input as a carry input to first adder 51 via first exclusive OR gate 56. For instance, carry input ci to first adder 51 becomes “0” when assuming EQ=“0” & MAX=“0”, or EQ=“1” & MAX=“1”. When either of data EQ or MAX is “1” while the other is “0”, carry input ci to first adder 51 becomes “1”. A sign bit of the most significant bit (MSB) at 15 is input to a fifth adder 55. A carry signal co of first adder 51 is input to second adder 52, a carry signal co of second adder 52 is input to third adder 53, a carry signal co of third adder 53 is input to fourth adder 54, and a carry signal co of fourth adder 54 is input to fifth adder 55; accordingly, “1” is added into the inverted least significant bit. In thus constituted second comparator 49, a complementary operation is carried out with adders 51 to 54, so that a subtraction operation is carried out so as to output, according to the compared result, a sign bit SIG, which will be explained later in detail with reference to FIG. 13.

Sign bit SIG output from fifth adder 55 and data MAX set in mode register 47 are compared by second exclusive OR gate 57 to output a comparison judgment signal cmp. Four-bit adders have been referred to in this preferred embodiment, however it is also possible for second comparator 49 to perform an carry operation with two-bit adders or adders of other numbers of bits.

FIG. 13 schematically illustrates the comparison judgment conditions, that is the comparison judgment signal cmp from second exclusive OR gate 57, data MAX and EQ, each set in mode register 47, and a magnitude relation between the data in registers RA–RF and the data in register S. For example, when data MAX and data EQ are assumed to be “0” respectively, carry input ci from first exclusive OR gate 56 becomes “0”, whereby when the inverted data of S register S and the non-inverted data of registers RA–RF are added, and when the data in S register S is smaller, sign bit SIG becomes “0”; but when the data in S register S is larger or equal, sign bit SIG becomes “1”. Then, if data MAX is assumed to be “0”, comparison judgment signal cmp becomes the same as sign bit SIG. In other words, The sign bit for the equal data in comparison becomes different in accordance with whether carry input signal ci is “1” or “0”.

FIG. 14 schematically illustrates a circuit diagram of decoder/controller circuit 46 of FIG. 11. The numeral 61 denotes a decoder; the numeral 62 denotes a control signal generator; the numeral 63 denotes an OR gate; the numeral 64 denotes an inverter; the numeral 65 denotes a J-K flip-flop; the numeral 66 denotes a status counter; the numeral 67 denotes a load signal generator; and the numeral 47 denotes the mode register shown in FIG. 10.

Address signal PAD of 16 bits at A00:A15 from processor 1 is decoded with decoder 61 so as to output an output control signal to be input from control signal generator 62 to a gate 48, a status counter loading signal STLD to status counter 66, and an S register loading signal SLD to S register according to read signal XRD or write signal XWR from processor 1. Data N2–NO of mode register 47 are loaded to status counter 66 by an application of a status counter load signal STLD from control signal generator 62 to load terminal LD of status counter 66.

S register loading signal SLD is input to S register S and is also input via an inverter 64 to J terminal of J-K flip-flop 65. Comparison judgment signal cmp and an output signal of terminal ST0 of status counter 66 are input via OR gate 63 to K terminal of J-K flip-flop 65. Output terminal Q of J-K flip-flop 65 becomes “1” to indicate that the sorting is on operation at the timing of clock signal CLK when S register loading signal SLD is “0”. Accordingly, “1” is input to an enable terminal EN of status counter 66 so that loaded data N2–N0 are counted down by clock signal CLK input to clock terminal CK while the content of the count is output from terminals ST6–ST0. From load signal generator 67 successively output are register loading signals RALD–RFLD, respectively, to load registers RA–RF, and index loading signals IALD–IFLD, respectively, to index loading registers IA–IF.

FIG. 15 schematically illustrates a timing chart to sort the six largest data according to the first preferred embodiment of the present invention. In the timing chart, CLK shows the first clock signal; SLD shows the S register loading signal; and S shows the content of S register S. ACT shows the signal of terminal Q of J-K flip-flop 65, N2 –N0 show the data of N2–N0 of mode register 47; and ST shows the content of status counter 66. S41 shows the selection status of third selector 41; and CMP shows the comparison judgment condition of second compactor 49. S42 shows the selection status of fourth selector 42; and RFLD & IFLD–RALD & IALD show loading signals of register RF & IF –RA & IA, respectively. T1, T2, T3 . . . indicate the moments of rises of first clock signal CLK.

If, for instance, data MAX=“1”, data EQ=“1”, data N2=“1”, data N1=“1”, and data N0=“0” are set from processor 1 to mode register 47, the comparison judgment signal of second comparator 49 indicates S≧RA–RF to sort the sixth (“110th”) largest data. Upon the rise of S register loading signal SLD from “0” to “1” at T1 the input data is loaded from processor 1 into S register S. At the same time, status counter 66 is loaded with N2–N0 (“110”) of mode register 47, and terminal Q of J-K flip-flop 65 becomes “1” as shown in ACT to indicate that the sorting is enabled to operate. Third selector 41 selects the data of register RF and index of F index register IF, and second comparator 49 compares the data of S register with the data of RF register, i.e. the current data at the sixth place.

When the comparison judgment condition of S≧RF at second comparator 49 is not satisfied, J-K flip-flop 65 is reset by comparison judgment signal cmp of second comparator 49 at the rise T2 of clock signal CLK so as to output “0” of ACT signal so that the sorting process is terminated. Then, the input data in this case is smaller data than the sixth place.

When the comparison judgment condition is satisfied, status counter 66 counts down by first clock signal CLK at T2 so that the content ST of status counter becomes “101”. Then, third selector 41 is controlled to select the data in E register RE and the index in E index register IE, and second comparator 49 compares the data of S register S with the data of E register RE, i.e. the current data of the fifth place.

Then, the comparison judgment condition is set S≧RE. If this new condition is not satisfied, the data in S register and the index in IDX register are selected by fourth selector 42 so that they are transferred via sixth and seventh selectors 44 and 45 to F register RF and F index register IF so as to be loaded therein by the rises of F register loading signal RFLD and F index register loading signal IFLD from “0” to “1”, respectively. Now, the input data shows the sixth size.

When current comparison judgment condition S≧RE is satisfied, status counter 66 counts down by first clock signal CLK at T3 so as to exhibit “100”. Accordingly, third & fourth selectors 41 & 42 select the data in E register RE and the index in E index register IE so that they are transferred via sixth & seventh selectors 44 & 45 to F register RF and F index register IF so as to be loaded therein by the rises of F register loading signal RFLD and F index register loading signal IFLD from "0" to "1", respectively. The data which has been at the sixth place is smaller than the input data, accordingly, is excluded from the sorting, and the data at the fifth place is shifted to the sixth place.

According to the similar procedure, data in D register RD and index in D index register ID are selected by third selector 41 so that second comparator 49 compares the data in S register S with the data in D register RD, i.e. the current data at the fourth place. If current comparison judgment condition S≧RD in this case is not satisfied, the data in S register and the index in IDX register are selected by fourth selector 42 so that they are transferred via sixth and seventh selectors 44 and 45 to E register RE and E index register IE at the rises of F register loading signal RELD and E index register loading signal IELD from "0" to "1", respectively.

If current comparison judgment condition S≧RD is satisfied, the data in D register RD and the index in D index register ID are selected by fourth selector 42 so that they are transferred via sixth and seventh selectors 44 and 45 to E register RE and E index register IE by the rises of E register loading signal RELD and E index register loading signal IELD from "0" to "1" at the rise of first clock signal CLK at T4, respectively. Thus, the data at the fourth place is shifted to the fifth place.

Then, status counter 66 counts down by first clock signal CLK at T4 so as to exhibit "011". Accordingly, third selector 41 is controlled to select the data in C register RC and the index in C index register IC so that second comparator 49 compares the data in S register with the data at the third place in C register RC. If condition S≧RC revised in the similar way is not satisfied, the data in S register and the index in IDX register are selected by fourth selector 42 so that they are transferred via sixth and seventh selectors 44 and 45 to D register RD and D index register ID so as to be loaded therein by the rises of E register loading signal RELD and E index register loading signal IELD from "0" to "1", respectively.

When comparison judgment condition S≧RC is satisfied, the data in C register RC and the index in C index register IC are selected by fourth selector 42 so that they are transferred via sixth and seventh selectors 44 and 45 to D register RD and D index register ID by the rises of F register loading signal RFLD and F index register loading signal IFLD from "0" to "1" at the rise of first clock signal CLK at T5, respectively. Thus, the data at the third place is shifted to the fourth place.

Then, status counter 66 counts down by first clock signal CLK at T5 so as to exhibit "010". Accordingly, third selector 41 is controlled to select the data in B register RB and the index in B index register IB so that second comparator 49 compares the data in S register S with the data of the second place in B register RB. If condition S ≧RB revised in the similar way is not satisfied, the data in S register and the index in IDX register are selected by fourth selector 42 so that they are transferred via sixth and seventh selectors 44 and 45 to C register RC and C index register IC so as to be loaded therein by the rises of C register loading signal RCLD and C index register loading signal ICLD from "0" to "1", respectively.

When comparison judgment condition S≧RB is satisfied, the data in B register RB and the index in B index register IB are selected by fourth selector 42 so that they are transferred via sixth and seventh selectors 44 and 45 to C register RC and C index register IC by the rises of C register loading signal RCLD and C index register loading signal ICLD from "0" to "1" at the rise of first clock signal CLK at T6, respectively. Thus, the data at the second place is shifted to the third place.

Then, status counter 66 counts down by first clock signal CLK at T6 so as to exhibit "001". Accordingly, third selector 41 is controlled to select the data in A register RA and the index in A index register IA so that second comparator 49 compares the data in S register with the data at the first place in A register RA. If condition S≧RA revised in the similar way is not satisfied, the data in S register and the index in IDX register are selected by fourth selector 42 so that they are transferred via sixth and seventh selectors 44 and 45 to B register RB and I index register IB so as to be loaded therein by the rises of B register loading signal RBLD and B index register loading signal IBLD from "0" to "1", respectively.

When comparison judgment condition S≧RA is satisfied, the data in A register RA and the index in A index register IA are selected by fourth selector 42 so that they are transferred via sixth and seventh selectors 44 and 45 to B register RB and B index register IB by the rises of B register loading signal RBLD and B index register loading signal IBLD from "0" to "1" at the rise of first clock signal CLK at T7, respectively. Thus, the data at the first place is shifted to the second place.

Then, status counter 66 counts down by first clock signal CLK at T7 so as to exhibit "000". Accordingly, fourth selector 42 is controlled to select the data in S register and the index in S index register IDX, so that they are transferred to A register RA and A index register IA so as to be loaded therein by the rises of A register loading signal RALD and A index register loading signal IALD from "0" to "1", respectively. Thus, the data loaded in S register S is now at the first place. Status counter 66 having become "000" outputs "1" from its terminal ST0 so as to reset J-K flip-flop 65 at the rise of first clock signal CLK at TB, whereby ACT becomes "0" indicating the end of the sorting operation. As mentioned already, if AIN="1" of mode register 47 the index is updated automatically by the termination of the sorting operation; however, if AIN="0" the index is not updated.

By thus repeating the above operations, the second input data, a processed result of processor 1, are loaded in A register RA–F register RF, so that A register RA is at the first place and F register RF is at the sixth place. A third selector 41 selects the sixteen-bit data at 15:00 stored in A registers RA–F register and eight-bit indexes at 23:16 respectively stored in index registers IA–IF. Fifth selector 43 selects the sixteen-bit data at 15:00 or another sixteen-bit data having eight bits of "0" at all of 15:08 and an eight-bit index at 07:00. An output from fifth selector 43 is sent as a second output data to processor 1 via gate circuit 48 enabled by an output control signal "0" from control signal generator 62 shown in FIG. 14.

Once becoming "0", S register loading signal SLD to load S register becomes "1" by the rise of first clock signal CLK at T9, the operation similar to those at T1 is carried out so that the three bits of data in registers N2 –N0 of mode register 47 are loaded into status counter 66, so as to set "110" therein. Then, the data in S register S and the data in F register RF are compared by second comparator 49. If the comparison judgment condition S≧RF is satisfied, the data in S register S is compared with the data in E register RE at T10 of clock signal CLK. If S<RE, fourth selector 42 selects the data in S register and the index in index register IDX, so that they are transferred to F register RF and F index register IF, and are loaded therein, respectively.

If MAX="0" and EQ="0" are in mode register 47, the conditions indicate the minimum value sorting, S<RA–RF, where data of minimum value is loaded into A register RA, and other data are loaded into registers RB–RF in ascending order. In the case where after processor obtains a residual power error between the input speech data and a data array of data read out from a code book in accordance with the input speech data, the data of the residual power error are successively input to the present data sorting circuit 5 whereby the minimum value is sorted up to the sixth place, the sorting operation can be finished in seven cycles at maximum for a single input speech data.

FIG. 16 schematically illustrates a timing chart of a sorting operation to sort largest five data as a second preferred embodiment of the present invention, where the same notations as in FIG. 15 show the same signals or data, and IDX denotes an index. In this case, bits N2–N0 in mode register 47 is assumed to be "101", and other conditions are the same as the above-described. An initial index IDX is shown with N. At the rise of first clock signal CLK at the first T1, S register loading signal SLD rises from "0" to "1"; the input data is loaded into S register S; J-K flip-flop 65 is set as shown with ACT="1"; "101" in mode registers N2–N0 are loaded into status counter 6B as shown with ST; third selector 41 selects the data in E register RE as shown with S41=RE and selects the index in E index register IE; and second comparator 49 compares the data in S register S with the data in E register RE, i.e. the current data at the fifth place.

When comparison judgment condition, S≧RE, of comparator 49 is satisfied, status counter 66 counts down so as to become "100" at the rise of first clock signal CLK at the next T2, third selector 41 selects the data in D register RD and index in D index register ID so that second comparator 49 compares the data in register S with the data in D register RD. Then, if comparison judgment condition S ≧RD is satisfied, the data in D register RD and the index in D index register ID is transferred to E register RE and E index register IE, and they are loaded therein at the rises of E register loading signal RELD and E index loading signal IELD, respectively, from "0" to "1". And, status counter 66 becomes "011" by its down count; and third selector 41 selects the data in C register RC and the index in C index register IC so that second comparator 49 compares the data in register S with the data in C register RC. Then, if comparison judgment condition S≧RC is satisfied, the data in C register RC and the index in C index register IC are transferred to D register RD and D index register ID, and are loaded therein by loading signals RDLD and IDLD, respectively.

And, status counter 66 becomes "010" by its down count; and third selector 41 selects the data in B register RB and the index in B index register IB so that second comparator 49 compares the data in register S with the data in B register RB. Then, if comparison judgment condition S≧RB is satisfied, the data in B register RB and the index in B index register IB are transferred to C register RC and C index register IC, and are loaded therein by C register loading signal RCLD and C index loading signal ICLD, respectively.

In the same way, status counter 66 becomes "001" by its down counting; and third selector 41 selects the data in A register RA, which has been at the first place, and the index in A index register IA so that second comparator 49 compares the data in S register S with the data in A register RA. Then, if comparison judgment condition S≧RB is satisfied, the data in A register RA and the index in A index register IA are transferred to B register RB and B index register IB, and are loaded therein by B register loading signal RBLD and B index register loading signal IBLD, respectively. Then, status counter 66 becomes "000" by its down counting; and the data in A register RA and the index in A index register IA are selected by fourth selector 42, and are loaded therein by A register loading signal RALD and A index loading signal IALD, respectively.

Then, the index is updated to N+1. The input data in this case is loaded into A register RA as the maximum value. Next, new input data is loaded into S register S by S register loading signal SLD, so that an operation similar to the above-described operation is carried out. In this case, the sorting operation can be finished in six cycles at maximum for a single input data.

FIG. 17 schematically illustrates a timing chart of a sorting operation to sort four largest data as a third preferred embodiment of the present invention, where the same notations as in FIGS. 15 & 16 show the same signals or data. In this case, bits N2–N0 in mode register 47 are "100", and other conditions are the same as the above-described. The initial index IDX is shown with N, which can be chosen arbitrarily. At the rise of first clock signal CLK at T1, S register loading signal SLD rises from "0" to "1"; the input data is loaded into S register; flip-flop 65 is set as shown with ACT="1"; N2–N0 (="101") is loaded in status counter 66 as shown with ST; third selector 41 selects the data in D register RD as shown with S41=RD and selects the index in D index register ID; and second comparator 49 compares the data in S register with the data in D register RD, i.e. the current data at the fifth place.

The data in S register is compared successively with the data of registers RD and RC, RB, and RA by second comparator 49. When the comparison judgment condition is satisfied, the data in S register is loaded in A register RA at the rise of A register loading signal RALD from "0" to "1". Meanwhile, status counter 66 counts down; upon "000" the index in index register IDX becomes N+1. The next data can be loaded into S register S later than the cycle of ST="000". When S register loading signal SLD rises from "0" to "1", signal ACT becomes "1" again so as to repeat the above-mentioned operations. In the timing chart of FIG. 17 is shown the case where the data in S register is smaller than the data in A register RA at T9, then the data in S register is loaded into B register RB by B register loading signal RBLD. Sorting of three or two largest data can be performed by the operation similar to the above-mentioned.

FIG. 18 schematically illustrates a timing chart of a sorting operation to sort the first place, i.e. the maximum data, as a fourth preferred embodiment of the present invention, where the same notations as those in FIGS. 15, 16 & 17 show the same signals or data. In this case, bits N2 –N0 in mode register 47 are set "000", while other conditions are the same as those of the above description. At the rise of first clock signal CLK at T1, S register loading signal SLD rises from "0" to "1"; the input data now denoted with DN0 is loaded into S register S; and an initial value 0 is loaded in index register IDX. Then, J-K flip-flop 65 is set to output ACT="1"; bits N2–N0 (i.e. ="000") are loaded in status counter 66; third selector 41 selects the data in A register RA and the index in IA register; and second comparator 49 compares the data DN0 in S register with the data in A register RA.

At the beginning of the sort operation the data in A register RA is 0 satisfying the comparison judgment condition S≧RA. Data in S register S and the index in index register IDX are selected by fourth selector 42 at the rise of first clock signal CLK at T2 and are transferred to registers RA and IA so as to make IA=0, RA=DN0 and register IDX updated to be 1. At the rise of first clock signal CLK at the next T2, S register loading signal SLD rises so that S register S becomes ready to be loaded with the next input data now denoted with DN1. In this fourth preferred embodiment is shown the case where fourth selector 42 always selects the data in S register S and the index in index register IDX, while data A register loading signal RALD and A index loading signal IALD are applied to A register RA and A index loading signal upon requirement.

Data DN1 in S register and data DN0 in A register RA are compared by second comparator 49. Then, if S<RA, which indicates that comparison judgment condition S≧RA is not satisfied, the preceding state is maintained because of no application of A register/A index loading signals RALD nor IALD even when fourth selector 42 selects the data in S register S and the index in index register IDX. Also at the next T3, when the next input data DN2 and DN0 are compared, if S<RA, data DN0 in A register RA is kept as it is and the index in index register IDX is updated to become 2.

When the following input data DN3 is loaded into S register S so as to be compared with the data DN0 in A register RA by comparator 49. Then, if comparison judgment condition S≧RA is satisfied, data DN3 in S register is loaded into A register RA and index 3 in index register IDX is loaded into A index register IA by A register loading signal RALD and A index loading signal IALD, respectively. With the similar procedures hereinafter, if the input data are such that DN0<DN3<DN5<DN6, where DN5 and DN6 denote the data at T7 and T8, respectively, the index in A index register IA is updated to have 0, 3, 5 or 6, respectively, corresponding to the data in A register RA. In this case, data DN6 loaded in A register RA at first clock signal CLK T10 indicates the maximum value.

In this case, too, if MAX="0" and EQ="0" are set, the minimum value is sorted according to the comparison judgment condition of S<RA. If MAX="0" and EQ="1 are set, the minimum value can be sorted according to the comparison judgment condition of S≦RA. Then, the operation is finished in a single cycle for a single input data because only the first place is to be sorted.

Convolution coding circuits, either of prior art or of the present invention, receive a third input data, which is the result of the compressing operation of processor 1 together with data array forming circuit 2 and data sorting circuit 5, before transmitted out of the compressing circuit. An input data Di, in the third input data, to be processed in the convolution coding circuit is serially input to the convolutional coding circuit.

FIG. 19 schematically illustrates a prior art convolution coding circuit. The convolution coding circuit is constituted with a shift register 70 of n stages of flip-flops F/F, to which input data Di to be convolution coded are serially input, shifted successively by first clock signal CLK, and cleared by a clear signal CLR, and a convolution coding operation circuit 72 to which outputs D0–D(n−1) from each interstage of shift register 70 are input in parallel. Shift register 70 corresponds to shift register 7; and convolution operating circuit 72 corresponds to convolution operating circuit 8, each of FIG. 2.

The outputs D0–D(n−1) at each of the interstages are obtained by shifting n times the input data Di, where suffix i indicates integers from 0 to n−1. There are $2^n$ kinds of patterns, i.e. combinations, of the outputs D0–D(n−1). Therefore, in order to input all the combination to convolution operating circuit 72, $n\times 2^n$ times of inputs of data Di are necessary. Accordingly, the present invention is constituted such that a predetermined typical combination of bits, as test data, is input in parallel into shift register 71 upon an application of a test signal TEST thereto.

FIG. 20 schematically illustrates a convolution coding circuit 6 of the present invention in detail, wherein test data can be set in parallel into shift register 7 in testing the convolution coding circuit. Convolution coding circuit includes a shift register 71, which is formed of, for example, eight flip-flops F0–F7 and eight selectors SL0–SL7, each of which is serially connected to an input terminal of each flip-flop F0–F7. Outputs D0–D(n−1) from each interstage of shift register 71 are input in parallel to convolution coding operation circuit 72 in the same way as the FIG. 19 prior art. Selectors SL0–SL7 are controlled by test signal TEST. DBUS denotes the data bus, for example in this case, of eight bits; CLK denotes first clock signal; and CLR denotes a clear signal. The serial data Di input to shift register 71 is shifted one by one, and a convolution operating circuit 72 performs a convolution operation of the data which has been input thereto and data at each stage of shift register 71.

Convolution operating circuit 72 of FIG. 20 schematically illustrates a case where four convolution coding data g0(D), g1(D), G1(D), and G2(D) are output by operating outputs D0–D7 from each stage of shift register 71. The logic structure of the convolution coding circuit is specified that:

$$g0(D)=D^0+D^1+D^3+D^5 \quad (1)$$

$$g1(D)=D^0+D^2+D^3+D^4+D^5 \quad (2)$$

$$G1(D)=D^0+D^1+D^2+D^5+D^6+D^7 \quad (3)$$

$$G2(D)=D^0+D^3+D^4+D^5+D^6+D^7 \quad (4)$$

where $D^0$–$D^7$ represent D0–D7, and + represents an exclusive OR operation. The formulas were disclosed in the same SPECIFICATION and also originally in "Error Coding: Fundamentals and Applications" by Shu Lin and Daniel J. Costello, Jr. published from Prentice Hall, 1983, pp330.

If test signal TEST is now assumed to be "0" for instance, eight selectors SL0–SL7 select input data Di or the output of the preceding J-K flip-flop. Then, the shift register operates as a usual shift register in which input data Di is successively shifted by first clock signal CLK. However, if test signal TEST is "1", the bit on the corresponding bit line of data bus DBUS is selected. Therefore, with test signal TEST "1" a test pattern, for instance, "10101010" sent from processor 1 via data bus DBUS of eight bits are set in parallel into eight flip-flops F0 –F7. The operations of each flip-flop F0–F7 of shift register 71 and the convolution operating circuit 72 can be verified by checking the outputs g0(D), g1(D), G1(D) and G2(D) from convolution operating circuit 72.

Thus, the results of $2^8$ kinds of the test pattern can be obtained with only $2^8+1$ cycles of convolution coding operation because $2^8$ kinds of the test pattern can be set in the shift register without the shifting operation.

FIG. 21 schematically illustrates a variation of convolution coding circuit as a fifth preferred embodiment of the present invention. A shift-register 71' is formed of, for example, eight flip-flops F10–F17 each of which has a preset terminal and a clear terminal. A second control circuit 73 receives test data, i.e. test pattern, via data bus DBUS and a test signal TEST from the processor so as to output a clear signal CLR and a preset signal PST. Preset signal PST and clear signal CLR are respectively formed of, for example eight bits. Bit lines carrying the preset signal or the clear signal is formed of, accordingly, eight-bit lines, each one of which is input to each flip-flop. Convolution operating circuit 72 is the same as those of FIGS. 19 and 20.

Two-parallel-bit coded data g0(D) and g1(D) output from convolution operating circuit 72 may be converted into serial data, as well as two-parallel-bit coded data G1(D) and G2(D) may be converted into serial data so that the serial data can be modulated according to, for example, 4-phase PSK or QAM modulation method, so as to be transmitted.

It is apparent that the convolution coding operation of the present invention is not limited to the above-mentioned method specified with formulas (1)–(4), but may be modified in accordance with the modulation system, etc. The quantity of the stages of shift register 71 is not limited to eight stages, but can be selected corresponding to the constraint length of the data to be convolution-coded.

FIG. 22 schematically illustrates a typical circuit diagram of second control circuit 73. The numerals 81 and 82 denote OR gates; and the numerals 83 and 84 denote inverters. Test signal TEST "0" indicating an ordinary mode is input to inverter 84; the signal inverted thereby to "1" is input to OR gate 81 so that both the clear signal CLR of eight bits from OR gates 81 and the preset signal PST from OR gate 82 become to have "1" on each bit. Therefore, flip-flops F10–F17 successively shift input data Di by first clock signal CLK so that each of outputs D0–D7 from each stage are input in parallel to convolution operating circuit 72 so as to output convolution coded data g0(D), g1(D), G1(D) and G2(D).

If test signal TEST is "1" the output of inverter 84 becomes "0", and the bit of "0" in the test pattern on the 8-bit data bus DBUS is inverted to become "1" by inverter 83 so as to make "0" bit in clear signal CLR and "1" bit in preset signal PST. Thereby, the flip-flop which received these signal is cleared to output "0". The bit of "1" in the test pattern is inverted to be "0" so as to make preset signal PST "0", and clear signal CLR "1". Thereby, the flip-flop which received theses signals is preset to output "1".

Thus, when test pattern is assumed to be "10101010" clear signal CLR becomes "10101010", and preset signal PST becomes "01010101" so that outputs D0–D7 of flip-flops F10–F17 become "10101010", the same as the test data. In this preferred embodiment, too, the test pattern can be set in shift register 71' in parallel without the shifting operation. Therefore, the result of $2^8$ kinds of the test pattern can be obtained with only $2^8+1$ cycles of convolution coding operation because $2^8$ kinds of the test pattern can be set in the shift register without the shifting operation.

Though a PSI-SELP was referred to in the above preferred embodiments as a typical field where the present invention can be embodied, it is apparent that the present invention can be embodied in other known vector quantizer methods.

Embodiment of the present invention is not limited only to the above-mentioned preferred embodiments but also can be variously modified. For instance, memory 3 of data array formation circuit 2 may be formed of a random access memory (RAM) instead of read-only memory (ROM).

Thus, the low bit rate coding system according to the present invention is advantageous in that the operation steps of processor 1 can be reduced, whereby the memory capacity required as a work area for the process and the power consumption required for the memory operation can also be reduced.

Owing to the comparator circuit and the plural registers each provided in data sorting circuit 5, when, for instance, the data of the first place of the maximum value or the minimum value is to be sorted the operation can be finished by a single cycle for a single input data. When the data is to be sorted till the sixth place including the maximum or the minimum value the operation can be finished by seven cycles for a single input data. Therefore, it is advantageous that the sorting operation can be faster than the case where the sorting operation is carried out fully with software. The comparator circuit being formed of an adder circuit and a judgment circuit, each relatively simple, is advantageous in a fast data comparing operation in the sorting operation.

Owing to shift register 71 or 71' in convolution coding circuit 6 constituted such that test data can be set in parallel thereto, it is advantageous that verification of convolution coding circuit 6 can be performed with less operation cycles.

Though in the above preferred embodiments the data array forming circuit 2, the data sorting circuit 5 and the convolution coding circuit 6 are operated all together with a single processor 1, it is apparent that each of the three circuits can be embodied independently from each other.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications are equivalents may be resorted to, falling within the scope of the invention.

What I claim is:

1. A low bit rate coding system comprising:

a processor for compressing input speech data input thereto so as to output a first input data; and a data array forming circuit receiving said first input data, comprising:

a memory device for storing a plurality of kinds of basic data groups; and an address generating circuit for generating an address to access said memory device, wherein said data array forming circuit forms a data array in accordance with said input speech data by selectively reading word data out of a plurality of kinds of blocks read out of said basic data groups according to said address, a plurality of said read blocks being arbitrarily specified by the processor, and by combining said plurality of kinds of blocks selectively read out of said basic data groups according to said address, each of said read blocks containing a different quantity of said word data; and wherein said address generating circuit comprises;

a first selector for selecting a head address of each said read block;

a first counter to be set with said head address selected by said first selector, for outputting said address of said word data;

a second counter for counting said quantity of said word data read out from said memory device according to said address output from said first counter; and a comparator for comparing a count counted by said second counter with said quantity of word data set in each block, and for setting a head address of a next word data selected at an equality comparison result by said first selector into said first counter.

2. A low bit rate coding system as recited in claim 1, wherein said first selector performs a state transition every time said each block of word data is read out of said memory device so as to select a head address of said block in accordance with the transited state; and said address generating circuit further comprises:

a control circuit for controlling the selection of the quantity of word data to be compared with said count of said second counter.

* * * * *